US009220292B2

(12) United States Patent
Jenkins

(10) Patent No.: US 9,220,292 B2
(45) Date of Patent: Dec. 29, 2015

(54) PROTEIN BEVERAGE AND METHOD OF MAKING SAME

(71) Applicant: NEXT Proteins, Inc., Carlsbad, CA (US)

(72) Inventor: David A. Jenkins, Carlsbad, CA (US)

(73) Assignee: NEXT PROBLEMS, INC., Carlsbad, CA (US)

(*) Notice: Subject to any disclaimer, the term of this patent is extended or adjusted under 35 U.S.C. 154(b) by 0 days.

(21) Appl. No.: 14/259,097

(22) Filed: Apr. 22, 2014

(65) Prior Publication Data
US 2015/0064317 A1 Mar. 5, 2015

Related U.S. Application Data

(63) Continuation-in-part of application No. 14/012,999, filed on Aug. 28, 2013, now abandoned, which is a continuation of application No. 13/078,918, filed on Apr. 1, 2011, now abandoned, which is a continuation-in-part of application No. 12/110,263, filed on Apr. 25, 2008, now abandoned, which is a continuation-in-part of application No. 11/685,641, filed on Mar. 13, 2007, now Pat. No. 7,842,326, and a continuation-in-part of application No. 11/683,338, filed on Mar. 7, 2007, now Pat. No. 7,794,770, and a continuation-in-part of application No. 11/683,380, filed on Mar. 7, 2007, now Pat. No. 7,799,363, and a continuation-in-part of application No. 11/683,375, filed on Mar. 7, 2007, now Pat. No. 7,906,160, and a continuation-in-part of application No. 11/373,412, filed on Mar. 10, 2006, now Pat. No. 7,897,192, which is a continuation-in-part of application No. 11/215,524, filed on Aug. 30, 2005, now Pat. No. 7,205,018.

(60) Provisional application No. 60/975,500, filed on Sep. 26, 2007, provisional application No. 60/956,663, filed on Aug. 17, 2007, provisional application No. 60/648,974, filed on Jan. 31, 2005, provisional application No. 60/648,914, filed on Jan. 31, 2005, provisional application No. 60/617,146, filed on Oct. 7, 2004.

(51) Int. Cl.
A23L 2/02 (2006.01)
A23L 2/66 (2006.01)
A23L 2/54 (2006.01)
A23C 21/00 (2006.01)
C12G 3/00 (2006.01)
A23L 2/42 (2006.01)
A23J 3/08 (2006.01)
A23J 3/16 (2006.01)
A23L 2/52 (2006.01)
A23L 2/68 (2006.01)

(52) U.S. Cl.
CPC . *A23L 2/66* (2013.01); *A23C 21/00* (2013.01); *A23J 3/08* (2013.01); *A23J 3/16* (2013.01); *A23L 2/02* (2013.01); *A23L 2/42* (2013.01); *A23L 2/52* (2013.01); *A23L 2/54* (2013.01); *A23L 2/68* (2013.01); *C12G 3/00* (2013.01); *A23C 2240/20* (2013.01); *A23V 2002/00* (2013.01)

(58) Field of Classification Search
CPC .................................................. A23L 2/74
USPC .............. 426/321, 324, 520, 590, 592, 656
See application file for complete search history.

(56) References Cited

U.S. PATENT DOCUMENTS

| 2,335,134 A | 7/1941 | Sands |
| 3,786,159 A | 1/1974 | Sato et al. |
| 3,846,560 A | 11/1974 | Hempenius et al. |
| 3,876,806 A | 4/1975 | Hempenius et al. |
| 3,949,098 A | 4/1976 | Bangert |
| 4,309,417 A | 1/1982 | Staples |

(Continued)

FOREIGN PATENT DOCUMENTS

| CN | 1060198 A | 4/1992 |
| CN | 101347155 | 1/2009 |

(Continued)

OTHER PUBLICATIONS

V.H. Holsinger, "Fortification of Soft Drinks with Protein from Cottage Cheese Whey", Adv. Exp. Med. Biol. v. 105:735-47 (1978).
Kudryavtseva et al. Carbonated Whey Beverage, Leningradskii Tekh, Inst. Kholodil'noi Promyshlennosti, Leningrad, USSR, Molochhnaya 1981, No. 5, 45-46 (abstract).
T. Senkevich, et al., entitled Milk Whey: Processing and Using in Agricultural Sector, Moscow, VO Agropromizdat, 1986, p. 136 (English translation of the Russian language is not readily available).
A. G. Khramtsov, et al. entitled The Technology of Products Made of Milk Whey, Moscow, DeLi print, 2004, p. 412 (English translation of the Russian language is not readily available).

(Continued)

*Primary Examiner* — Helen F Heggestad
(74) *Attorney, Agent, or Firm* — Jonathan L. Pettit; Duckor Spradling Metzger & Wynne

(57) ABSTRACT

A carbonated protein beverage composition and a method of making it relate to a beverage prepared using a cold-fill preparation and packaging process and carbonation in the container prior to sealing, providing a protein beverage composition with a protein content of about 2.0% by weight to about 6% by weight protein, carbon dioxide at level of between about 1.6 volumes to about 3.5 volumes, a pH of between about 2.0 to about 3.4, and at least one additional ingredient, wherein both, at the time of packaging of the protein beverage composition and during subsequent storage without refrigeration for a time period of at least 18 months after packaging, substantial solubility of the protein is maintained in the beverage composition, and the protein beverage is essentially free of active microbes known to be harmful to human health in the absence of a preservative, wherein the essentially free from active microbe condition is created by the inactivation of microbes by carbonation.

14 Claims, No Drawings

(56) References Cited

U.S. PATENT DOCUMENTS

| | | | |
|---|---|---|---|
| 4,443,540 A | 4/1984 | Cheryan et al. | |
| 4,478,855 A | 10/1984 | Dahlen et al. | |
| 4,478,858 A | 10/1984 | Baird et al. | |
| 4,486,413 A | 12/1984 | Wiesenberger et al. | |
| 4,790,998 A | 12/1988 | Swartz | |
| 4,804,552 A | 2/1989 | Ahmed et al. | |
| 4,830,862 A | 5/1989 | Braun et al. | |
| 5,153,019 A | 10/1992 | Hammond | |
| 5,286,511 A | 2/1994 | Klavons et al. | |
| 5,478,587 A | 12/1995 | Mingione | |
| 5,520,948 A | 5/1996 | Kvamme | |
| 5,641,531 A * | 6/1997 | Liebrecht et al. | 426/583 |
| 5,650,175 A | 7/1997 | Beck et al. | |
| 6,028,107 A | 2/2000 | Waugh | |
| 6,060,103 A | 5/2000 | Dunagan | |
| 6,106,874 A | 8/2000 | Liebrecht et al. | |
| 6,261,589 B1 | 7/2001 | Pearson et al. | |
| 6,403,129 B1 | 6/2002 | Clark et al. | |
| 6,432,929 B1 | 8/2002 | Stone | |
| 6,485,762 B1 | 11/2002 | Rizvi et al. | |
| 6,620,452 B1 | 9/2003 | Haddad et al. | |
| 6,623,781 B2 | 9/2003 | Rizvi et al. | |
| 6,635,223 B2 | 10/2003 | Maerz | |
| 6,740,344 B2 | 5/2004 | Murphy et al. | |
| 6,761,920 B1 | 7/2004 | Kaplan | |
| 6,811,804 B2 | 11/2004 | Patel et al. | |
| 6,835,402 B1 | 12/2004 | Clark et al. | |
| 6,866,877 B2 | 3/2005 | Clark et al. | |
| 7,041,327 B2 | 5/2006 | Hotchkiss et al. | |
| 7,101,585 B2 | 9/2006 | Shen et al. | |
| 7,118,776 B2 | 10/2006 | Wong et al. | |
| 7,205,018 B2 * | 4/2007 | Sherwood et al. | 426/583 |
| 7,258,883 B2 | 8/2007 | Winniczuk | |
| 7,794,770 B2 * | 9/2010 | Sherwood et al. | 426/583 |
| 7,799,363 B2 * | 9/2010 | Sherwood et al. | 426/583 |
| 7,842,326 B2 * | 11/2010 | Sherwood et al. | 426/583 |
| 7,897,192 B2 * | 3/2011 | Sherwood et al. | 426/583 |
| 7,906,160 B2 * | 3/2011 | Sherwood et al. | 426/74 |
| 2002/0127317 A1 | 9/2002 | Hotchkiss et al. | |
| 2002/0136816 A1 | 9/2002 | Kim | |
| 2003/0099753 A1 | 5/2003 | Yang | |
| 2003/0113408 A1 | 6/2003 | Clark et al. | |
| 2004/0156969 A1 | 8/2004 | Paulsen et al. | |
| 2005/0002992 A1 | 1/2005 | McCleary et al. | |
| 2005/0003054 A1 | 1/2005 | McCampbell | |
| 2005/0106218 A1 | 5/2005 | Ward et al. | |
| 2005/0106305 A1 | 5/2005 | Abraham et al. | |
| 2005/0233046 A1 | 10/2005 | Krawczyk et al. | |
| 2006/0083793 A1 | 4/2006 | Gardiner | |
| 2006/0083844 A1 | 4/2006 | Sherwood et al. | |
| 2006/0147602 A1 | 7/2006 | Sherwood et al. | |
| 2007/0082118 A1 | 4/2007 | Fletcher | |
| 2007/0148307 A1 | 6/2007 | Sherwood et al. | |
| 2007/0154614 A1 | 7/2007 | Sherwood et al. | |
| 2008/0008814 A1 | 1/2008 | Jackson et al. | |
| 2008/0063765 A1 | 3/2008 | Barbano et al. | |
| 2008/0206415 A1 | 8/2008 | Sherwood et al. | |
| 2008/0317928 A1 * | 12/2008 | Towler | 426/584 |
| 2009/0087495 A1 | 4/2009 | Toyomura et al. | |
| 2010/0047423 A1 | 2/2010 | Kruesemann et al. | |
| 2013/0129901 A1 * | 5/2013 | Segall et al. | 426/598 |

FOREIGN PATENT DOCUMENTS

| | | |
|---|---|---|
| CN | 101442915 | 5/2009 |
| DE | 2202267 A1 | 7/1972 |
| EP | 0812544 A2 | 12/1997 |
| EP | 0812544 A3 | 1/1999 |
| EP | 0852468 B1 | 3/2003 |
| EP | 1338210 A1 | 8/2003 |
| EP | 1338210 B1 | 4/2009 |
| FR | 6443 | 4/1967 |
| FR | 6448 M | 4/1967 |
| GB | 2335134 A | 9/1999 |
| GB | 2335134 B | 6/2002 |
| IE | 0980707 A1 | 2/2000 |
| JP | 1-117768 | 5/1989 |
| JP | 02-124062 A | 11/1990 |
| JP | 07075521 A | 3/1995 |
| JP | 10042842 A | 2/1998 |
| JP | 11-512604 | 11/1999 |
| JP | 2004097119 A | 2/2004 |
| JP | 2006-501803 A | 1/2006 |
| RU | 2096975 C1 | 11/1997 |
| RU | 2197873 C1 | 2/2003 |
| TW | 200948291 | 12/2009 |
| WO | WO 97/11614 | 4/1997 |
| WO | 03/043446 A1 | 5/2003 |
| WO | WO 03/043431 | 5/2003 |
| WO | WO 2006/042222 A2 | 4/2006 |
| WO | WO 2006/058083 A2 | 6/2006 |
| WO | WO 2007/027213 A1 | 3/2007 |
| WO | WO 2007/106731 | 9/2007 |
| WO | WO2009112036 | 9/2009 |

OTHER PUBLICATIONS

English translation of the Russian Office Action dated Dec. 9, 2010.
English Translation of Japanese Office Action (Notice of Reason(s) for Rejection) Japanese Patent Application No. 2014-502882, Date of dispatch: Sep. 8, 2015, Examiner of the Patent Office: Naoko Kamimura.

* cited by examiner

PROTEIN BEVERAGE AND METHOD OF MAKING SAME

RELATED APPLICATIONS

This application is related to U.S. Pat. No. 7,205,018, filed Aug. 30, 2005 as U.S. patent application Ser. No. 11/215,524, issued Apr. 17, 2007, and entitled "Carbonated Protein Drink and Method of Making," which is related to U.S. Provisional Patent Application Ser. No. 60/617,146, filed Oct. 7, 2004, and entitled: "Carbonated Whey Protein Beverage;" U.S. Provisional Patent Application Ser. No. 60/648,914, filed Jan. 31, 2005, and entitled: "Carbonated Aqueous Whey Protein Beverage and Method of Making Same;" and, U.S. Provisional Patent Application Ser. No. 60/648,974, filed Jan. 31, 2005, and entitled: "Dry Carbonated Whey Protein Beverage and Method of Making Same"; U.S. Pat. No. 7,897,192, filed Mar. 10, 2006 as U.S. patent application Ser. No. 11/373,412, issued Mar. 1, 2011, and entitled "High Energy Carbonated Protein Drink and Method of Making", which is a Continuation-In-Part patent application of U.S. Pat. Nos. 7,205,018; 7,794,770, filed Mar. 7, 2007 as U.S. patent application Ser. No. 11/683,338, issued Sep. 14, 2010, and entitled "Protein Beverage and Method of Making the Same", which is a Continuation-In-Part patent application of U.S. Pat. Nos. 7,205,018; 7,906,160, filed Mar. 7, 2007 as U.S. patent application Ser. No. 11/683,375, issued Mar.15, 2011, and entitled "Protein Beverage and Method of Making the Same", which is a Continuation-In-Part patent application of U.S. Pat. Nos. 7,205,018; 7,799,363, filed Mar. 7, 2007 as U.S. patent application Ser. No. 11/683,380, issued Sep. 21, 2010, and entitled "Protein Beverage and Protein Beverage Concentrate and Methods of Making the Same", which is a Continuation-In-Part patent application of U.S. Pat. Nos. 7,205,018; 7,842,326, filed Mar. 13, 2007 as U.S. patent application Ser. No. 11/685,641, issued Nov. 30, 2010, and entitled "Carbonated Protein Drink and Method of Making", which is a Continuation application of U.S. Pat. No. 7,205,018.

This application claims priority to U.S. patent application Ser. No. 14/012,999, filed Aug. 28, 2013, which is related to U.S. patent application Ser. No. 13/078,918, filed Apr. 1, 2011, entitled "Protein Beverage and Method of Making The Same", which is related to U.S. patent application Ser. No. 12/110,263, filed Apr. 25, 2008, and entitled "Protein Beverage and Method of Making The Same", which is related to U.S. Provisional Patent Application Ser. No. 60/956,663, filed Aug. 17, 2007, and entitled: "Protein Beverage and Method of Making the Same" and U.S. Provisional Patent Application Ser. No. 60/975,500, filed Sep. 26, 2007, and entitled "Protein Beverage and Method of Making the Same"; Each of these patent applications is hereby incorporated by reference in its entirety.

BACKGROUND OF THE INVENTION

1. Field of the Invention

The present invention pertains to a protein beverage and protein beverage concentrate, and to methods of making the protein beverage and protein beverage concentrate.

2. Brief Description of the Background Art

This section describes background subject matter related to the disclosed embodiments of the present invention. There is no intention, either express or implied, that the background art discussed in this section legally constitutes prior art. Moreover, this brief description is not intended to fully describe the subject matter of this art, the reader is invited to more thoroughly examine the background to better understand what is disclosed.

Milk contains two major protein fractions, casein, which may provide about 80% by weight of the total protein, and whey protein, which may provide about 20% by weight of the total protein. The whey protein fraction is the protein fraction which may remain soluble when the casein fraction is coagulated (such, for example, as by either enzyme or acid) and separated as cheese curd. Whey protein may include several protein fractions, including, for example, β-lactoglobulin, α-lactoglobulin, Lactalbumin, immunoglobulins (such as IgG1, IgG2, IgA, and IgM, for example), lactoferrin, glycomacropeptides, and lactoperoxidase.

Compared to casein and untreated soy (e.g., aqueous soy protein isolate; unacidified soy), whey proteins may be highly soluble. Whey proteins may be the least soluble at typically about pH 4.5 to about pH 5.5, which may be the isoelectric point (the pH at which the net electrical charge is zero) for whey protein. In higher acid systems with a pH less than about 4.5, such as in many carbonated beverages, the acid solubility of whey proteins may be especially important; however, protein precipitation may occur during the mixing period when the pH of the whey protein, which typically has a pH of about 6 to about 7, transitions through the zone of isoelectric points. Protein solubility may be affected by heat, and therefore the elevated temperatures experienced during pasteurization may also negatively affect solubility and fluidity resulting in protein precipitation or gelation.

Whey protein may have a higher biological value and/or protein digestibility corrected amino acid score (PDCAAS) than casein. The physical properties of whey proteins in the digestive tract may be quite distinct from the properties of casein. Caseins may form curds within the stomach, which curds may be slow to exit from the stomach and which curds may increase their hydrolysis prior to entering the small intestine. Alternatively, whey proteins may reach the jejunum almost immediately; however their hydrolysis within the intestine may be slower than that of caseins, so their digestion and absorption may occur over a greater length of the intestine.

The protein efficiency ratio (PER) of a protein source measures the weight gain of young animals per gram of protein eaten over a given time period. Any protein having a PER of 2.5 is considered good quality. Whey protein is considered to be a nutritionally excellent protein, as it has a PER of 3.2. Casein has a PER of 2.5, while many commonly used proteins have a PER of less than 2.5, such as soy protein (PER 2.2), corn protein (PER 2.2), peanut protein (PER 1.8), and wheat gluten (PER 0.8). The higher PER of whey protein may be due in part to the high level of sulfur-containing amino acids in whey protein. Such higher level may contribute to whey protein's ability to enhance immune-function and antioxidant status.

Whey protein is a rich source of branched chain amino acids (BCAAs), containing the highest known levels of any natural food source. BCAAs are important for athletes, since, unlike the other essential amino acids, they are metabolized directly into muscle tissue and are the first amino acids used during periods of exercise and resistance training. Thus, intake of BCAAS can be beneficial before periods of exercise and resistance training, or during recovery after periods of exercise and resistance training BCAAS are also important for the elderly, those recovering from illness or surgery, those involving heavy physical work, and those enduring times of stress, as well as athletes or sports participants. Leucine may be important for athletes, the elderly, those recovering from illness or surgery, those involving heavy physical work, and those enduring times of stress, as it may play a key role in muscle protein synthesis and lean muscle support and growth. Research suggests that individuals who exercise benefit from diets high in leucine and may have more lean muscle tissue and less body fat than individuals whose diet contains lower levels of leucine. Whey protein isolate may have approximately 45% by weight more leucine than soy protein isolate.

Whey protein is available in several forms, with preparations which may range from about 1% to about 99% whey protein. Whey protein preparations may be in an aqueous form created by the removal of casein, but often takes several other forms, such as, for example, but not by way of limitation, a whey protein extract, whey protein concentrate, whey protein isolate, or whey protein hydrolysate.

Whey protein concentrate may be prepared by removing sufficient non-protein constituents from whey by membrane filtration, so that the finished dry product may be selected to contain whey protein at a given concentration which may range from about 25% by weight to about 89.9% by weight protein.

Whey protein isolate may be obtained by removing sufficient non-protein constituents from whey by membrane filtration or ion exchange absorption, so that the finished dry product may contain about 90% by weight or more whey protein, and little, if any, fat, cholesterol, or carbohydrates (e.g., lactose). Prior to concentration and spray drying, aqueous whey protein isolate (WPIaq) may have a whey protein concentration of about 1% by weight to about 35% by weight, and may also be essentially free of fat, cholesterol, and carbohydrates.

Whey protein hydrolysate is a whey protein preparation which may have been subjected to enzymatic digestion with a protease enzyme or limited acid hydrolysis, or a suitable mechanical breakage of peptide bonds to form smaller peptides and polypeptides. The protein concentration of the whey protein hydrolysate may be dependent upon the starting material. For example, a whey protein hydrolysate prepared from an 80% by weight whey protein concentrate may have an 80% by weight protein concentration, and a whey protein hydrolysate prepared from a 90% by weight whey protein isolate may have a 90% by weight protein concentration. Not all hydrolyzed whey proteins may behave alike in a food formulation, and thus one hydrolyzed whey protein may not be interchangeable with another. The functional and biological properties of whey protein hydrolysates may vary depending upon factors, such as degree of hydrolysis and which protease enzyme is used for hydrolysis.

Although hydrolysis of whey protein may lead to increased solubility, it may also negatively impact the taste. Whey protein typically has a fresh, neutral taste which may allow it to be included in other foods without adversely affecting the taste. However, hydrolysis of whey protein may result in a very bitter taste, which may impose a practical limit on the amount of whey protein hydrolysate that can be used in a food product. Therefore, a high protein beverage made with whey protein hydrolysate may require a large amount of sweeteners, or bitter masking agents to overcome the bitter taste. However, such a large amount of sweetener may not be desirable to many consumers or the bitter aftertaste of the high protein beverage may be difficult or impossible to mask to a satisfactory extent for some applications.

Whey protein contains all of the essential amino acids, and therefore, is a high quality, complete source of protein, where complete means that whey protein contains all the essential amino acids for growth of body tissues. Since whey protein is available in forms containing little fat and carbohydrates, it may be a particularly valuable source of nutrition for athletes and for individuals with special medical needs (e.g., lactose intolerant individuals), the elderly, those recovering from illness or surgery, those involving heavy physical work, and those enduring times of stress, and may be a valuable component of a diet program. Further, since whey protein may contain biologically active proteins such as the immunoglobulins, lactoperoxidase, and lactoferrin, whey protein may provide advantages over other protein sources such as soy protein. Carbonated protein beverages are refreshing products that may provide whey or other desirable proteins to the consumer, e.g., athletes, for individuals with special medical needs (e.g., lactose intolerant individuals), the elderly, those recovering from illness or surgery, those involving heavy physical work, those enduring times of stress, and those interested in weight control, but these carbonated products are to be consumed before or after periods of exercise or intense work, but not during periods of exercise or intense work, as consumption of such carbonated beverages during exercise or intense work may have negative effects such as nausea and vomiting.

Milk and dairy based products may provide an excellent environment for the growth and propagation of a wide spectrum of microorganisms. Pasteurization, by the application of heat for a specific time, has been the traditional method used for more than 100 years to prevent or reduce the growth of microorganisms and to increase the shelf life of milk and dairy based products. Pasteurization may not kill all microorganisms in milk and dairy products. However, it does reduce their numbers so they are unlikely to cause illness in the people consuming those products. Non-sterile dairy products, including pasteurized dairy products, typically have a shelf life that is limited to a short period of time such as a few weeks due to spoilage from the growth of microorganisms which survived pasteurization or were introduced by post-processing microbial contamination.

The traditional method of pasteurization was vat pasteurization, which involved heating the liquid ingredients in a large vat or tank for at least 30 minutes. Variations on the traditional pasteurization methods have been developed, such as, high temperature short time (HTST) pasteurization, ultra pasteurization (UP) processing, and ultra high temperature (UHT) pasteurization. These variations on the traditional pasteurization method use higher temperatures for shorter times, and may result in increased shelf lives which may exceed 3 months without refrigeration. However, regardless of the pasteurization method used, stabilizers and preservatives may often be needed to improve the stability of pasteurized products.

Thermal processing by any pasteurization method may have detrimental effects on the organoleptic and nutritional properties of milk and dairy based products. Thus, there may be a need for more non-thermal methods of extending shelf life, which will not significantly decrease or alter the organoleptic and nutritional properties of milk and dairy based products.

One alternative to pasteurization may be high pressure processing (HPP), which may be especially suited to high acid content foods. HPP is a food processing method where food products may be exposed to elevated pressures, in the presence or absence of heat, to inactivate microorganisms. HPP may also be known as high hydrostatic pressure processing (HPP) and ultra high-pressure processing (UHP).

Non-thermal HPP may be used to extend the shelf life of milk and dairy based products without detrimentally altering the organoleptic and nutritional properties of these products. Non-thermal HPP may eliminate thermal degradation, and may allow for the preservation of 'fresh' characteristics of foods. Shelf lives similar to those of pasteurized products may be achieved from HPP.

HPP of a milk or dairy based product may be achieved by placing the product in a container within a water (or other pressure-transmitting fluid) filled pressure vessel, closing the vessel, and increasing the pressure exerted upon the container by pumping more water into the pressure vessel by way of an external pressure intensifier. The elevated pressure may be held for a specific period of time, then it may be decreased. Pressure levels of about 600 MPa at 25° C. may typically be enough to inactivate vegetative forms of microorganisms, such as non-spore forming pathogens, vegetative bacteria, yeast and molds.

HPP is explained in more detail in U.S. Pat. No. 6,635,223 B2 to Maerz, issued Oct. 21, 2003, entitled "Method for inactivating microorganisms using high pressure processing", wherein a method for inactivating microorganisms in a product using high pressure processing is disclosed. The method involves the steps of packing the product in a flexible container, heating the product to a pre-pressurized temperature, subjecting the product to a pressure at a pressurized temperature for a time period; and reducing the pressure after that time period. The method may also further comprise an additional step of subjecting the product to a predetermined amount of oxygen for a time interval. These methods may be applied to food, cosmetic or pharmaceutical products.

Carbon dioxide ($CO_2$), a naturally occurring component of raw milk that decreases as raw milk is exposed to air or is pasteurized, is known to have antimicrobial properties. $CO_2$ results in minimal harm in foods. Therefore, it is a suitable agent for inhibiting food spoilage microorganisms. Currently, there are at least three general mechanisms known by which $CO_2$ inhibits microorganisms. These mechanisms, outlined briefly below, are discussed in more detail in an article by J. H. Hotchkiss et al., in Comprehensive Reviews in Food Science and Food Safety 2006; 5: 158-168, titled: "Addition of carbon dioxide to dairy products to improve quality: a comprehensive review".

One mechanism by which $CO_2$ may inhibit microbial growth may simply be by the displacement of $O_2$ by $CO_2$. Another mechanism by which $CO_2$ may inhibit microbial growth may be by lowering the pH of the food by the dissolution of $CO_2$ and formation of carbonic acid in the aqueous phase of the food by the following equilibrium reactions: $H_2O+CO_2 \leftrightarrow H_2CO_3 \leftrightarrow H^+ + HCO_3^- \leftrightarrow 2H' + CO_3^{2-}$. The third mechanism by which $CO_2$ may inhibit microbial growth is by a direct effect of $CO_2$ on the metabolism of microorganisms.

The last mentioned mechanism, the direct antimicrobial effect of $CO_2$ on the metabolism of microorganisms, may be the result of changes in membrane fluidity due to $CO_2$ dissolution, reductions in intracellular pH, and direct inhibition of metabolic pathways, including decarboxylation reactions and DNA replication. $CO_2$ is quite lipophilic, which may allow for it to concentrate within the lipid membrane of bacteria, or to pass through the lipid membrane and to concentrate within the bacterial cell lowering intracellular pH. $CO_2$ may also interfere directly with required enzymatic processes within microorganisms, such as gene expression.

Published European patent application. EP 0812544 A2 of Henzler et al., published Dec. 17, 1997, entitled "Method for preparing dairy products having increased shelf-life", describes a method for preparing dairy products having increased shelf-life by incorporating $CO_2$ into such products, comprising contacting a fluid milk fraction of a dairy foodstuff with $CO_2$, mixing the fluid milk fraction and $CO_2$ into a solution, and subjecting the solution to conditions sufficient to reach a steady state between the fluid milk fraction and dissolved $CO_2$. The patented method is said to be adapted for consumer dairy products of a wide variety, increasing shelf-life to about 45 to about 60 days.

The interaction between HPP and $CO_2$ and their effects on food spoilage enzymes and microorganisms were described by Corwin and Shellhammer in Journal of Food Science 2002; 67: 697-701, entitled "Combined carbon dioxide and high pressure inactivation of pectin methylesterase, polyphenol oxidase, *Lactobacillus plantarum* and *Escherichia coli*." The enzymes studied were pectin methylesterase (PME) and polyphenol oxidase (PPO) and the microorganisms studied were *Lactobacillus plantarum* ATCC 8014 (*L. plantarum*), an acid tolerant, lactic acid producing, non-spore forming, Gram positive bacterium, and *Escherichia coli* K12 (*E. coli*), an acid sensitive, non-spore forming, Gram negative bacterium. The objective of the study was to determine the effect of $CO_2$ on increasing the efficacy of pressure processing to inactivate enzymes and microorganisms. $CO_2$ was added at approximately 0.2 molar % to solutions processed at 500 to 800 MPa in order to further inactivate PME, PPO, *L. plantarum*, and *E. coli*. A significant interaction was found between $CO_2$ and pressure at 25° C. and 50° C. for PME and PPO, respectively. Activity of PPO was said to be decreased by $CO_2$ at all pressure treatments. Survival of *L. plantarum* was said to be decreased by the addition of $CO_2$ at all pressures and the combination of $CO_2$ and high pressure had a significant interaction. $CO_2$ was said not to have a significant effect on the survival of *E. coli* under pressure.

U.S. Pat. No. 7,041,327 B2 to Hotchkiss et al., issued May 9, 2006, entitled "Carbon dioxide as an aid in pasteurization", describes processes to inhibit or reduce the growth of bacteria and other pathogens in a liquid by adding $CO_2$ to the liquid, and thermally inactivating the bacteria and other pathogens, so that the $CO_2$ enhances the thermal inactivation process. The process is said to be applicable to a wide variety of fluids, liquids, semi-solids and solids. Prior to or simultaneously with thermal inactivation $CO_2$ is added to the product by sparging or bubbling, preferably to obtain levels of about 400-2000 ppm. At this level of $CO_2$, the amount of microbial death that occurs during heating in a normal pasteurization (HTST) process is said to be increased by 10% to 90% over thermal inactivation carried out without the addition of $CO_2$ prior to the thermal inactivation step. After completion of the thermal inactivation process, the free $CO_2$ is said to be removed.

Protein precipitation and separation out of proteins in protein beverages during manufacturing, shipping, and storage, may be compounded when the beverage contains an additional component, such as juice. Methods are known in the art for attempting to overcome the precipitation of protein from juice beverages. However, most of these methods involve the use of stabilizers.

Fiber or other carbohydrates may be added as a protein stabilizing agent, such as pectin, cellulose gum, xanthan gum, gum arabic, carageenan, guar gum, dextrin, cyclodextrin such as α-cyclodextrin (cyclohexaamylose, CAS No. 10016-20-3), maltodextrin such as FIBERSOL® soluble dietary fiber products, VITASUGAR™ brand fiber (Bio Neutra, Edmonton, Canada), dextrose monohydrate, and polydextrose. While stabilizers can help prevent protein precipitation, they may have the disadvantage of increasing the viscosity of the drink due to cross-linking with naturally present calcium cations. This increased viscosity may be undesirable as it may lead to a beverage having poor organoleptic properties for at least some applications. The range of amount of stabilizer which may be used may be quite narrow. For example, at a pectin concentration of below 0.06% by weight, sedimentation may be a significant problem, whereas above it, the viscosity of the beverage may be undesirably high. The ideal amount of stabilizer must be experimentally determined for each beverage formula, and may need to be adjusted from one batch to the next. Thus, a beverage formula which does not include a protein stabilizer but generates a beverage with good protein solubility is desirable for many applications.

U.S. Pat. No. 7,101,585 B2, to Shen et al., issued Sep. 5, 2006, entitled: "Ultra High Pressure Homogenization Process for Making a Stable Protein Based Acid Beverage" describes a process for preparing a stable suspension of an acid beverage, wherein a hydrated protein stabilizing agent (A) and a flavoring material (B) are combined as a preblend (I) and combined with either a slurry of a homogenized protein material (C) or a homogenized preblend (II) of a hydrated protein stabilizing agent (A) and a slurry of a protein material (C) to form a blend and pasteurizing and homogenizing the blend. The homogenization of the blend is carried out in two stages comprising a high pressure stage of from 8000-30,000 pounds per square inch and a low pressure stage of from 300-1,000 pounds per square inch. The acid beverage composition has a pH of from 3.0 to 4.5. This beverage contains juice, but is not carbonated. Pectin is added as a stabilizer.

Published Patent Application US 2003/0099753 A1 of Yang, published May 29, 2003, describes a fruit juice based beverage composition containing a protein selected from the group consisting of whey protein isolate and a combination of whey protein isolate and whey protein hydrolysate; a carbohydrate selected from the group consisting of sucrose, fructose, high fructose corn syrup 42 (HFCS 42), HFCS 55, combination of sucrose, fructose, HFCS 42, and HFCS 55, and combinations of maltodextrin with another carbohydrate selected from the group consisting of sucrose, fructose, HFCS 42, and HFCS 55; an edible acid selected from the group consisting of citric acid, phosphoric acid, combinations of citric acid and phosphoric acid, and combinations of malic acid with another edible acid selected from the group consisting of citric acid and phosphoric acid; a fruit juice or combinations of fruit juices; various vitamins and minerals; and optional fibers and flavors and a process for making such composition. The composition containing the above ingredients are asserted to be clear, have a pH of about 4.0 or less, and have a viscosity of less than about 40 centipoises. Protein stabilizing agents are used, including pectin.

U.S. Pat. No. 4,478,858 to Dahlen et al., issued Oct. 23, 1984, entitled: "Protein containing fruit drink and process for the manufacture thereof", discloses a protein containing fruit juice drink comprising a fruit juice portion of 10-85% containing a citrus juice portion, a milk raw material portion of 90-15% by weight in which the milk raw material portion comprises whey proteins in an amount of 0.5-10% by weight of the finished product, and, as a sweetener, a hydrolyzed lactose, made of substantially pure lactose prepared from whey or a permeate from ultrafiltration of milk or whey, containing pure glucose and galactose derivative, which is alleged to act as a binder of the protein even in fruit drinks containing a citrus juice portion. The fruit drink may be manufactured in a concentrated form from a protein concentrate, concentrated fruit juice and/or fruit aromas and a concentrated hydrolysed lactose. A polysaccharide containing stabilizer may be added to the concentrate.

DETAILED DESCRIPTION OF CERTAIN EMBODIMENTS

As a preface to the detailed description, it should be noted that, as used in this specification and the appended claims, the singular forms "a", "an", and "the" include plural referents, unless the context clearly dictates otherwise.

The terms "about" and "approximately" as used herein, indicate that the precision of the nominal value presented is ±10%.

The protein beverage composition of the disclosed embodiments of the present invention, produced using the methods described below, provides a high protein content (relative to previously described drinks), where the protein beverage composition may be a non-carbonated still beverage or a carbonated beverage.

We have developed an improved protein beverage/drink, which contains a high protein concentration compared with protein concentrations of drinks previously known in the industry. The typical concentration of protein ranges from about 0.01% by weight to about 15% by weight, more typically the protein concentration ranges from about 2% by weight to about 15% by weight, with the most typical concentration ranging from about 2% by weight to about 8% by weight.

We have developed an improved carbonated protein beverage/drink, which contains a high protein concentration compared with protein concentrations of drinks previously known in the industry, and remarkable shelf life wherein substantial solubility of the protein is maintained in the beverage composition and wherein the protein beverage is essentially free of active microbes known to be harmful to human health, both at the time of packaging of the protein beverage and for a time period of at least 18 months after packaging, and up to at least about 30 months after packaging, wherein the beverage is prepared and packaged without thermal processing, and carbonation is used to inactivate active microbes. The carbonated protein beverage/drink with remarkable shelf life can be prepared using carbonation to inactivate active microbes and without using another method to inactivate active microbes. The carbonated protein beverage/drink with remarkable shelf life can be prepared using carbonation during packaging and another method such as thermal processing after packaging. The carbonated protein beverage/drink with remarkable shelf life can be prepared without the use of preservatives. The carbonated protein beverage/drink with remarkable shelf life can be prepared without the use of anti-foaming agent. The carbonated protein beverage/drink with remarkable shelf life can be prepared using all natural ingredients. The carbonated protein beverage/drink can be a non-pasteurized beverage/drink with remarkable shelf life, prepared using carbonation to inactivate active microbes and without using another method to inactivate active microbes, wherein substantial solubility of the protein is maintained in the beverage composition and wherein the protein beverage is essentially free of active microbes known to be harmful to human health, both at the time of packaging of the protein beverage and for a time period of at least 18 months after packaging and typically for up to at least about 30 months. The non-pasteurized carbonated protein beverage/drink with remarkable shelf life can be prepared using all-natural ingredients, without preservatives, without the use of an anti-foaming agent, and without artificial flavors, colors, or sweeteners.

Protein or protein isolate is suitable for use in the carbonated protein beverage/drink. Suitable protein or protein isolate can include, without limitation, aqueous whey protein isolate collected from membrane filtration isolation, wet whey hydrolysate, wet soy protein such as aqueous soy protein isolate, reconstituted dried whey protein, reconstituted dried soy protein isolate that has been processed to remain soluble at lower solution pH values than typical aqueous soy protein isolate, and combinations thereof, and optionally including amino acids such as leucine, isoleucine, and valine. The typical concentration of protein in the carbonated protein beverage/drink having remarkable shelf life wherein substantial solubility of the protein is maintained in the beverage composition and wherein the protein beverage is essentially free of active microbes known to be harmful to human health, both at the time of packaging of the protein beverage and for a time period of at least 18 months after packaging, ranges from about 0.01% by weight to about 15% by weight, more typically the protein concentration ranges from about 2% by weight to about 15% by weight, and even more typically the protein concentration ranges from about 2% by weight to about 8% by weight. In certain non-limiting embodiments, the protein concentration may be about 2.0% by weight, or about 2.1% by weight, or about 2.2% by weight, or about 2.3% by weight, or about 2.4% by weight, or about 2.5% by weight, or about 2.6% by weight, or about 2.7% by weight, or about 2.8% by weight, or about 2.9% by weight, or about 3% by weight, or about 3.1% by weight, or about 3.2% by weight, or about 3.3% by weight, or about 3.4% by weight, or about 3.5% by weight, or about 3.6% by weight, or about 3.7% by weight, or about 3.8% by weight, or about 3.9% by weight, or about 4.0% by weight, or about 4.1% by weight, or about 4.2% by weight, or about 4.3% by weight, or about 4.4% by weight, or about 4.5% by weight, or about 4.6% by weight, or about 4.7% by weight, or about 4.8% by weight, or about 4.9% by weight, or about 5.0% by weight, or about 5.1% by weight, or about 5.2% by weight, or about 5.3% by weight, or about 5.4% by weight, or about 5.5% by weight, or about 5.6% by weight, or about 5.7% by weight, or about 5.8% by weight, or about 5.9% by weight, or about 6.0% by weight, where the weight may be calculated to one, two, three, or more decimal places. It is understood that "% by weight" protein can also be expressed as "% (w/w)" protein herein.

The adjusted pH value of the carbonated protein beverage/drink having remarkable shelf life, ranges from about 2.0 to about 6.0, more typically from about 2.0 to about 4.6, even more typically from about 2.0 to about 3.4. A pH adjusting agent such as phosphoric acid, citric acid, tartaric acid, fumaric acid, adipic acid, and in some instances lactic acid, can be used. Excess citric acid and malic acid can cause tartness and astringency of taste and produce an unpalatable beverage that has an unacceptable mouth-feel when consumed. Phosphoric acid is presently preferred as a pH adjusting agent, as the quantity required to obtain a desired pH may be typically less, and the taste of the beverage may be less affected by the pH adjustment. The adjusted pH of the protein drink typically ranges from about 2.0 to about 5.5, more typically from about 2.0 to about 3.4. The protein drink may be prepared without the use of phosphoric acid and using only one or more organic acids such as citric acid, malic acid, tartaric acid, alone or in combination, if there is an interest in avoiding inorganic or mineral edible acids, and/or an interest in promoting the use of organic acids in the product. The pH may be adjusted only once, or may be adjusted more than once, during manufacture and packaging of the carbonated protein beverage/drink, to arrive at the target adjusted pH value. It is understood that one of skill in the art can determine the target adjusted pH value on the basis of factors including but not limited to, the ingredients used in manufacture, the intended use for the final product, and the desired organoleptic properties of the final product.

In certain embodiments, a carbonated protein beverage composition with remarkable shelf life is provided, the beverage comprising about 2.0% by weight to about 6% by weight protein, carbon dioxide at level of between about 1.6 volumes to about 3.5 volumes, a pH of between about 2.0 to about 3.4, and at least one additional ingredient, wherein the composition is prepared without an anti-foaming agent, and the carbonated protein beverage composition is packaged in a sealed container to which the carbon dioxide is added to the container prior to sealing the container, wherein the carbonated protein beverage composition is prepared and packaged (containerized) using a "cold-fill" process such that the beverage does not undergo thermal processing during preparation and packaging, and wherein both, at the time of packaging of the protein beverage composition and during subsequent storage without refrigeration for a time period of at least 18 months after packaging, substantial solubility of the protein is maintained in the beverage composition, and the protein beverage is essentially free of active microbes known to be harmful to human health in the absence of a preservative, wherein the essentially free from active microbe condition is created by the inactivation of microbes by carbonation.

In some embodiments, the carbonated protein beverage composition with remarkable shelf life is a non-pasteurized carbonated protein beverage composition prepared by the cold-fill method and carbonation in the container, and without thermal processing of the sealed container after packaging. In some embodiments of the non-pasteurized carbonated protein beverage composition prepared by the cold-fill method and carbonation in the container, substantial solubility of the protein is maintained in the beverage composition, and the protein beverage is essentially free of active microbes known to be harmful to human health, for a time period of at least 30 months after packaging.

In some embodiments, the carbonated protein beverage composition prepared by the cold-fill method and carbonation in the container, may be a pasteurized carbonated protein beverage composition that undergoes thermal processing of the sealed container. In certain embodiments, the thermal processing comprises pasteurizing the sealed container to a temperature of 143° F. for about 10 minutes, for example using a tunnel pasteurization method. In some embodiments of the carbonated protein beverage composition prepared by the cold-fill method and carbonation in the container, followed by thermal processing of the sealed container, substantial solubility of the protein is maintained in the beverage composition, and the protein beverage is essentially free of active microbes known to be harmful to human health, for a time period of at least 30 months after packaging.

In some embodiments, the carbonated protein beverage composition is prepared using all natural ingredients. In some embodiments, the carbonated protein beverage composition is prepared without a preservative. In some embodiments, the turbidity of the carbonated protein beverage composition is less than 30 NTU. In some embodiments, the carbonated protein beverage composition is prepared with protein or protein isolate selected from the group consisting of whey protein, soy protein, casein, lactalbumin, serum albumin, glycomacropeptide, rice protein, pea protein, canola protein, wheat protein, hemp protein, zein, flax protein, egg white protein, ovalbumin, gelatin protein, hydrolyzed collagen protein, and a combination thereof.

Methods of preparing the carbonated protein beverage having remarkable shelf life using "cold-fill" process of preparation and packaging (containerization) and carbonation in the container are provided, wherein both, at the time of packaging of the protein beverage composition and during subsequent storage without refrigeration for a time period of at least 18 months after packaging, substantial solubility of the protein is maintained in the beverage composition, and the protein beverage is essentially free active microbes known to be harmful to human health. In some embodiments, an amount of protein isolate to give a final concentration of about 2.0% by weight to about 6% by weight protein, a pH adjusting agent in an amount to get a final pH of between about 2.0 to about 3.4, at least one additional ingredient, and an amount of water are admixed to give a final desired volume of beverage admixture, filling the beverage admixture into a sealable container, adding carbon dioxide to the beverage admixture in the container in an amount to give a final at level of between about 1.6 volumes to about 3.5 volumes carbon dioxide, and sealing the container, without thermal processing during admixing, container filling, carbonation of the beverage admixture, and container sealing.

Some embodiments of the method provide pasteurized carbonated protein beverage, where the method further comprises thermal processing of the sealed container of carbonated protein beverage composition, for example by pasteurizing the sealed container of carbonated protein beverage composition to a temperature of 143° F. for about 10 minutes. Some embodiments of the method provide a non-pasteurized carbonated protein beverage composition, wherein the sealed container does not undergo thermal processing. In some embodiments, the beverage is prepared without a preservative. In some embodiments, at least one additional ingredient selected from the group a consisting of juice, alcohol, a flavoring agent, a sweetening agent, a coloring agent, and an energy-generating agent is admixed into the beverage admixture. In some embodiments, dietary fiber is admixed into the beverage admixture. Some embodiments of the method provide a non-pasteurized all-natural carbonated protein beverage composition, wherein the at least one additional ingredient is a natural ingredient and wherein the sealed container does not undergo thermal processing.

In some embodiments, the method uses an acidified concentrated protein admixture prepared by diluting aqueous protein isolate having greater than about 24% by weight protein, collected from membrane-filtration isolation of the protein without substantial drying, and a balance of water to obtain a protein admixture having a protein concentration of between about 20% at about 23% by weight protein, with a pH adjusting agent to provide a pH of between about 2 and about 3.4, thereby obtaining an acidified concentrated protein admixture, storing the acidified concentrated protein admixture, at room temperature for up to about 10 days or with refrigeration for up to about a month, until the acidified concentrated protein admixture is needed for preparing the protein beverage, and then admixing the acidified concentrated protein admixture to give a final concentration of about 2.0% by weight to about 6% by weight protein, a pH adjusting agent in an amount to get a final pH of between about 2.0 to about 3.4, at least one additional ingredient, and an amount of water to give a final desired volume of beverage admixture, filling the beverage admixture into a sealable container, adding carbon dioxide to the beverage admixture in the container in an amount to give a final at level of between about 1.6 volumes to about 3.5 volumes carbon dioxide, and sealing the container, without thermal processing during admixing, container filling, carbonation of the beverage admixture, and container sealing.

In certain embodiments, a protein beverage composition suitable for human consumption comprises: protein essentially free of caseinate and derived from an aqueous protein isolate, which has been collected from membrane-filtration isolation of the protein and has never been dried; and, wherein the protein beverage composition exhibits a pH ranging from about 2.0 to about 4.6, whereby substantial solubility of the protein is maintained in the beverage composition, and wherein the protein beverage is essentially free of active microbes known to be harmful to human health, both at the time of packaging of the protein beverage and for a time period of at least 18 months after packaging. Typically, the protein beverage composition may contain about 0.01% by weight to about 15% by weight protein and a balance of water. More typically, the protein beverage composition may contain about 0.01% by weight to about 8% by weight protein and a balance of water. Most typically, the protein beverage composition may contain about 2% by weight to about 8% by weight protein and a balance of water. In some embodiments the protein may also be free of lactose and fat. In some embodiments, the protein beverage composition is carbonated.

In other embodiments, a method of preparing a protein beverage, comprising: admixing an aqueous protein isolate, which has been collected from membrane-filtration isolation of the protein and has never been dried, with a pH adjusting agent to provide a pH of between about 2 and about 4.6, thereby obtaining an admixture. Typically, the protein beverage may contain about 0.01% by weight to about 15% by weight protein and a balance of water. More typically, the protein beverage may contain about 0.01% by weight to about 8% by weight protein and a balance of water. Most typically, the protein beverage composition may contain about 2% by weight to about 8% by weight protein and a balance of water. In some embodiments, the protein beverage composition is carbonated.

In one embodiment, the aqueous protein isolate has a protein concentration of about 0.01% by weight to about 49% by weight. The aqueous protein isolate may be whey protein, milk serum protein, lactalbumin, serum albumin, glycomacropeptide, soy protein, egg white protein, ovalbumin, gelatin protein, hydrolyzed collagen, or any combination thereof.

In one embodiment, the protein is essentially free from caseinate. Typically, the essentially caseinate free protein is whey protein, of the kind previously described herein. In some embodiments, the essentially caseinate free protein may have some caseinate or may be a whey protein which may be derived from whey protein isolate or whey protein concentrate, although other whey protein preparations may be used, such as, for example, but not by way of limitation, a whey protein extract or a whey protein hydrolysate. The whey protein isolate may typically be an aqueous whey protein isolate, with a whey protein concentration of about 1% by weight to about 40% by weight. The whey protein concentrate may typically be an aqueous whey protein concentrate, with a whey protein concentration of about 1% by weight to about 40% by weight. In addition, the total protein content can be increased by the addition of mixtures of proteins such as whey protein and other proteins such as soy proteins.

In certain embodiments, the protein beverage suitable for human consumption comprises: about 2% by weight to about 8% by weight protein, derived from an aqueous protein isolate, which has been collected from membrane-filtration isolation of the protein and has never been dried, and a balance of water; and, wherein the protein beverage exhibits a pH ranging from about 3.0 to about 6.0, whereby substantial solubility of the protein is maintained in the beverage composition, and wherein the protein beverage is essentially free of active microbes known to be harmful to human health, both at the time of packaging of the protein beverage and for a time period of at least 18 months after packaging. The protein beverage may optionally further contain about 0% by weight to about 1.5% by weight flavor, about 0% by weight to about 0.5% by weight sweetener, about 0% by weight to about 0.5% by weight acidulent, about 0% by weight to about 0.1% by weight color, and about 0% by weight to about 1.5% by weight dietary fiber. In one embodiment, the aqueous protein isolate may be an aqueous whey protein isolate. In another embodiment, the aqueous protein isolate may be an aqueous soy protein isolate. In further embodiments, the aqueous protein isolate may be derived from one or more of edible aqueous proteins, such as, for example, but not limited to, whey protein, soy protein, casein, lactalbumin, serum albumin, glycomacropeptide, rice protein, pea protein, canola protein, wheat protein, hemp protein, zein, flax protein, egg white protein, ovalbumin, gelatin protein, hydrolyzed collagen, or a combination thereof. In some embodiments, the protein beverage composition is carbonated.

In certain embodiments, the protein beverage suitable for human consumption may be a flavored water beverage containing protein, which is comprised of about 2% by weight to about 8% by weight protein, derived from an aqueous protein isolate, which has been collected from membrane-filtration isolation of the protein and has never been dried, and a balance of water; and, wherein the protein beverage exhibits a pH ranging from about 3.0 to about 6.0, whereby substantial solubility of the protein is maintained in the beverage composition, and wherein the protein beverage is essentially free of active microbes known to be harmful to human health, both at the time of packaging of the protein beverage and for a time period of at least 18 months after packaging. The protein beverage may optionally further contain about 0% by weight to about 1.5% by weight flavor, about 0% by weight to about 0.5% by weight sweetener, about 0% by weight to about 0.5% by weight acidulent, about 0% by weight to about 0.1% by weight color, and about 0% by weight to about 1.5% by weight dietary fiber. In one embodiment, the aqueous protein isolate may be an aqueous whey protein isolate. In another embodiment, the aqueous protein isolate may be an aqueous soy protein isolate. In further embodiments, the aqueous protein isolate may be derived from one or more of edible aqueous proteins, such as, for example, but not limited to, whey protein, soy protein, casein, lactalbumin, serum albumin, glycomacropeptide, rice protein, pea protein, canola protein, wheat protein, hemp protein, zein, flax protein, egg white protein, ovalbumin, gelatin protein, hydrolyzed collagen, or a combination thereof.

Whey protein is a protein fraction obtained from mammalian milk. Commercially available whey protein is typically derived from the milk of cows; however, whey protein may be derived from the milk of any mammal, such as, for example, but not by way of limitation, the milk of goats, sheep, buffalo, camel, black bear, llama, deer, kangaroo, pig, dog, rabbit, elephant, dolphin, donkey, horse, seal, or human. Alternatively, whey protein may be prepared by recombinant DNA technology, using molecular biology techniques commonly known in the art.

In other embodiments, the protein may be any edible protein, other than whey protein, such as, for example, but not by way of limitation, casein, lactalbumin, serum albumin, glycomacropeptide, soy protein, rice protein, pea protein, canola protein, wheat protein, hemp protein, zein, flax protein, egg white protein, ovalbumin, gelatin protein, hydrolyzed collagen, or any combination thereof.

In another embodiment, the protein may be a combination of a whey protein, of the kind previously described herein, and an edible protein, other than whey protein, such as, for example, but not by way of limitation, casein, lactalbumin, serum albumin, glycomacropeptide, soy protein, rice protein, pea protein, canola protein, wheat protein, hemp protein, zein, flax protein, egg white protein, ovalbumin, gelatin protein, or hydrolyzed collagen.

In one embodiment the protein may be an aqueous soy protein isolate, with a soy protein concentration of about 0.01% by weight to about 49% by weight, or more typically of about 1% by weight to about 20% by weight. However, other aqueous protein isolates may be used. In another embodiment, the protein may be a soy protein isolate that has been processed to remain soluble at lower solution pH values than typical aqueous soy protein isolate.

Whey protein isolate may be obtained by removing sufficient non-protein constituents from whey by membrane filtration or ion exchange absorption, so that the finished dry product may contain about 90% by weight or more whey protein, and little, if any, fat, cholesterol, or carbohydrates (e.g., lactose). Prior to concentration and spray drying, the whey protein isolate is an aqueous whey protein isolate (WPIaq), which may have a whey protein concentration of about 0.01% by weight to about 49% by weight, and may also be essentially free of fat, cholesterol, and carbohydrates. This aqueous whey protein isolate may also be essentially free of caseinate and lactose.

Aqueous whey protein isolate (WPIaq) may be collected at a concentration by weight of about 20% to about 35% actual whey protein.

WPIaq may be diluted with water to a protein concentration of about 1% to about 24%, representing a range from single-strength beverage protein level to a concentrate suitable for acidification, nutrient addition, transport to a beverage manufacturing facility and subsequent dilution, thermal processing, and containerization. In certain embodiments, WPIaq may be diluted with water to a protein concentration of about 1% to about 24%, representing a range from single-strength beverage protein level to a concentrate suitable for acidification, nutrient addition, transport to a beverage manufacturing facility and subsequent dilution, carbonation, and containerization without thermal processing.

The distinct advantages of utilizing the aqueous protein stream from membrane filtration may include the absence of damage due to intense shear forces, heat, and dehydration which are inherent to traditional spray-dried protein powder ingredients. Additionally, there may be substantially lower microbial population, especially of yeasts, molds, and related spores which may be introduced into the ingredient during drying. Manufacturing economies are also afforded by obviating the need for spray drying the protein at the protein manufacturer and the re-hydration of protein powders as part of the beverage manufacturing process; time and labor savings as well as reduced protein foam interference may be among the benefits.

If not clouded by added ingredients, the flavor, odor, and clarity or transparency of the finished beverage may be generally superior to a beverage of identical nutrient composition which is produced using powdered whey protein isolate.

While not wishing to be bound by any present theory of action, it is presently believed that lowering the pH of the aqueous whey protein prior to addition to the beverage composition results in a protein beverage with superior organoleptic properties, by preventing or at least greatly reducing precipitation and gelling of the protein as it passes through the zone of isoelectric points. It is believed that prior art drinks did not attempt to move rapidly to the final pH and permitted the composition to dwell too long at low temperatures at or near the isoelectric point, thereby permitting much or all of the material to precipitate. With the inventors' discovery that this transient state of low solubility can be traversed before precipitation commences, practitioners can easily make these clear beverages with minimal testing.

Whey proteins have a high buffering capacity, and therefore this pH adjustment step tends to prevent the whey protein from buffering the acids of the beverage.

Lowering the pH of an aqueous protein isolate may also extend the shelf life of the aqueous protein isolate, allowing for greater storage and/or transportation time of the aqueous protein isolate prior to its use in a protein beverage. The addition of a pH adjusting agent to the aqueous protein isolate allows for the aqueous protein isolate to be stored at room temperature (about 21° C.) for about 10 days and under refrigeration (about 4° C.) for about a month prior to adding the acidified aqueous protein isolate to the protein beverage.

We have developed an improved concentrated WPIaq composition, and methods of making improved a concentrated WPIaq composition, providing a concentrated WPIaq composition suitable for storage and use at room temperature for up to about 10 days or with refrigeration for up to about a month. In a typical embodiment, aqueous whey protein collected from membrane filtration isolation having a protein content greater than about 24% (w/w), typically ranging between about 30% (w/w) to about 35% (w/w) is diluted to a concentration below about 24% (w/w), typically between about 10% (w/w) to about 24% (w/w), more typically between about 20% (w/w) to about 23% (w/w), and acidified to a pH between 2 and 4.6, more typically a pH between 2.6 to about 4, even more typically a pH between about 2.6 to about 3.4. Collection, dilution, and acidification to provide the improved concentrated WPIaq composition are typically carried out at room (ambient) temperature, which may typically range between about 35° F. to about 80° F. depending on circumstances and season, but may also be carried out under refrigeration. Acidified concentrated WPIaq in accordance with the present embodiments, having a protein concentration of between about 20% (w/w) to about 23% (w/w), remains stable and useful for up to 7-10 days at room temperature and up to 30 days (one month), whereas acidified WPIaq having a protein concentration of greater than about 24% (w/w), more typically acidified WPIaq having a protein concentration of between about 30% (w/w) to about 33% (w/w), does not exhibit such stability and usefulness, and sometimes exhibits gelling that renders the composition unusable. Acidified concentrated WPIaq in accordance with the present embodiments, having a protein concentration of between about 20% (w/w) to about 23% (w/w), remaining stable and useful for up to 7-10 days at room temperature and up to 30 days (one month), substantially exceeds previous expectations of only about 7 days of stability under refrigeration and significantly less at room temperature.

Acidified concentrated WPIaq in accordance with the present embodiments provides a stable protein composition that is not dried, thereby avoiding energy and other costs of drying and reconstitution, and thereby allowing preparation of a protein beverage, including preparation of a carbonated protein beverage, without the use of an antifoaming agent. Acidified concentrated WPIaq in accordance with the present embodiments, having a protein concentration of between about 20% (w/w) to about 23% (w/w), provides a stable composition having high protein concentration allowing efficiencies such as on energy and space associated with storage and transport, with flexibility such as being suitable for a variety of storage and transport mechanisms including but not limited to totes, cans, tanks, barrels, pipelines, or tankers, and suitable for a variety of storage and transport conditions such as refrigerated or unrefrigerated conditions, depending on needs and circumstances. It is understood that one of skill in the art can develop a suitable protocol for making or using acidified concentrated WPIaq in accordance with the present embodiments, based on evaluation of factors such as materials at hand, needs, and circumstances. In a non-limiting exemplary embodiment, acidified concentrated WPIaq in accordance with the present embodiments, having a protein concentration of between about 20% (w/w) to about 23% (w/w), could be shipped using a refrigerated tanker truck such as is common in transportation of milk over long distances, where the acidified concentrated WPIaq can be handled similarly to milk, e.g., the acidified concentrated WPIaq can flow out of the tanker truck for use at one or more destinations Improved acidified concentrated protein as provided herein can be made with wet protein isolate compositions other than aqueous whey protein isolate collected from membrane filtration isolation, including but not limited to, wet whey hydrolysate and wet soy protein such as aqueous soy protein isolate, reconstituted dried whey protein, reconstituted dried soy protein isolate that has been processed to remain soluble at lower solution pH values than typical aqueous soy protein isolate. It is understood that acidified concentrated protein as provided herein can be combinations of proteins. It is further understood that the amino acids can also be included, for example a combination of soy protein isolate plus amino acids such as leucine, isoleucine, and valine.

In non-limiting exemplary embodiments such as those found in the Examples, WPIaq collected from membrane filtration isolation having a protein content greater than about 24% (w/w) is diluted and acidified, transported, stored, and used to prepare protein beverages after storage. In one non-limiting embodiment, WPIaq collected from membrane filtration isolation having a protein content of 33.3% (w/w) can be diluted by the slow mixing of water in the amount of 25% of the original weight of the 33.3% (w/w) solution, and approximately 5% by weight of 85% phosphoric acid was added at a rate of around 5 Kg per minute with constant mixing, to a target pH of about 3.2+/−0.2 pH, yielding a 21.5% (w/w) concentration of aqueous whey protein isolate. The acidified WPIaq at 21.5% (w/w) protein can be transferred into totes secured with safety seals on top as well known to manufacturing operatives in the beverage concentrate industry, and on the following day the totes transported are a refrigerated truck with temperature set between 35-45° F. for two (2) days, and upon arrival at the beverage manufacturing plant, the totes can be held in storage at approximately 50-55° F. for about 40 hours prior to manufacture of fruit flavored carbonated protein beverages. Although previous experience taught that 33.3% (w/w) aqueous whey protein isolate could not be acidified successfully and transported for use in manufacture of carbonated or still protein beverages, the acidified aqueous whey protein at about 21.5% (w/w) according to the present embodiments, was not only stable for 7-10 days at room temperature (about 18.3° C.) for transportation from production site to beverage manufacturing plant, but also if refrigerated around 4° C., the 21.5% (w/w) aqueous whey protein isolate could be stored for about a month prior to adding the acidified aqueous whey protein isolate into the protein beverage manufacturing process.

In one embodiment of the invention a method of preparing a protein beverage is comprised of admixing an aqueous protein isolate, collected from membrane-filtration isolation of the protein without substantial drying with a pH adjusting agent to provide a pH of between about 2 and about 4.6, thereby obtaining an acidified protein admixture; storing the acidified protein admixture, at room temperature for up to about 10 days or with refrigeration for up to about a month, until the acidified protein mixture is needed for preparing the protein beverage; admixing the acidified protein mixture with at least one additional ingredient selected from the group consisting of water, juice, alcohol, carbonation, a concentrated plant extract, an anti-foaming agent, a nutrient, calcium or a calcium derivative, an energy-generating additive, an herbal supplement, a flavoring agent, a sweetener, a preservative, and a coloring agent.

In another embodiment of the invention a method of preparing a protein beverage is comprised of admixing an aqueous protein isolate, collected from membrane-filtration isolation of the protein without substantial drying with a pH adjusting agent to provide a pH of between about 2 and about 4.6, thereby obtaining an acidified protein admixture; transporting the acidified protein admixture, at room temperature for up to about 10 days or with refrigeration for up to about a month, to another geographic location where the acidified protein mixture is needed for preparing the protein beverage; admixing the acidified protein mixture with at least one additional ingredient selected from the group consisting of water, juice, alcohol, carbonation, a concentrated plant extract, an anti-foaming agent, a nutrient, calcium or a calcium derivative, an energy-generating additive, an herbal supplement, a flavoring agent, a sweetener, a preservative, and a coloring agent.

The typical concentration of juice in the finished beverage ranges from about 0% by weight to about 100% by weight, more typically the juice concentration ranges from about 0% by weight to about 98% by weight, with the most typical concentration ranging from about 0% to about 25% by weight. Typically the juice source may be fruit juice, vegetable juice, or a combination thereof, and may be added in whole, as a liquid, a liquid concentrate, a puree, or in another modified form containing one or more juice components. More typically, the juice may be depectinized, having had most of the pectins removed by enzymatic digestion, chromatography, precipitation, or by another method of juice depectinization. One method by which the juice may be depectinized is by treating it with pectinase enzyme, as described in detail in U.S. Pat. No. 6,620,452 B1. A depectinized juice may typically be a juice with a pectin content of about 0.05 weight % to about 0.25 weight %.

A single fruit juice, a single vegetable juice, fruit juice blends, vegetable juice blends, or fruit and vegetable juice blends may be used. Examples of a few of the many specific juices which may be used may include juice from alfalfa sprouts, apples, apricots, avocados, bamboo shoots, bananas, beans, bean sprouts, beets, berries of all types, cabbage, carrots, celery, cherries, cucumbers, currants, dates, figs, grapefruits, grapes, guava, kiwi, kumquat, lemons, limes, lychee fruit, mandarin, mango, melons of all types, nectarines, noni, oranges, papaya, passion fruit, peaches, pears, pineapples, plums, pomegranates, prunes, radishes, rhubarbs, rutabagas, seaweed, squash, tangelo, tangerines, tomatoes, and/or turnips; however, any type of juice may be used.

In some embodiments the protein beverage may be carbonated. The amount of carbonation which has been achieved while maintaining stability of the carbonated drink is unexpectedly high in view of the amount of protein present, with the amount of carbonation ranging from about 0.1 volumes of carbonation (per volume of liquid present in the beverage) to about 6 volumes of carbonation. More typically, the amount of carbonation present ranges from about 1.6 volumes to about 3.5 volumes, with the most typical concentration ranging from about 1.7 volumes to about 3.0 volumes.

Additives may be combined with the basic high protein beverage formulation to provide a "high energy" high protein beverage. For example, caffeine may be added to increase the level of circulating fatty acids in the body of a consumer of the beverage. This increase in circulation has been shown to increase the oxidation of these fuels, enhancing fat oxidation in general. Caffeine is well known as a means of enhancing fatty acid metabolism.

Another additive which may be included is magnesium. Magnesium may affect energy level and may be needed for more than about 300 biochemical reactions in the body. Magnesium may help regulate blood sugar levels, may promote normal blood pressure, and may support energy metabolism and protein synthesis.

A third additive may be added to affect energy level. The third additive may be citrulline malate. Citrulline is an amino acid which may play a role in nitrogen balance and metabolic processes. Supplemental citrulline malate is a salt form of the amino acid. Citrulline malate may improve aerobic performance and capacity by influencing lactic acid metabolism and reducing fatigue.

One or more of these effects on metabolism have been supported by evidence of an increase in the rate of oxidative adenosine triphosphate (ATP), which is essentially a "molecular currency" of intracellular energy transfer, and an increase in energy production during the exercise of muscles. These three additives which assist in the generation of energy, and combinations thereof, have been formulated into the high protein beverages described herein with little or no adverse effect on manufacturability or shelf storage life of the product.

The citrulline malate energy generating additive may have a very bitter taste in free form. We were surprised to discover that citrulline malate employed in a protein beverage of the kind described herein, provides a pleasant tasting beverage without the need to make a major modification from the recipes which do not contain the citrulline malate.

In addition to the high protein concentration, the protein beverage is essentially free from biologically pathogenic microbes such as bacteria and other spoilage pathogens of the kind which are monitored by the food industry in general. Due to the method used to inactivate the biologically pathogenic microbes, the protein beverage is essentially free from these pathogenic microbes for more than 18 months after packaging of the protein beverage into individual containers or servings and storage under shelf conditions which are standard in the unrefrigerated beverage industry. In addition to absence of biologically pathogenic microbes, there is little or no precipitation of protein, little or no thickening, flavor and color are maintained, and taste and mouth feel are maintained. In formulations which are designed to be transparent, without turbidity, the protein beverage is essentially clear in color after this storage period. The recommended storage temperature is above freezing (32° F.) to about 75° F. Storage of the protein beverage at temperatures in excess of 100° F. for time periods of several months, such as about five months, are even possible without detriment to the taste and clarity.

In one embodiment, the protein drink may be treated to inactivate microbes in the presence of carbonation which may be used to provide taste and mouth feel for the drink, while maintaining the required minimal amount of carbonation to provide such taste and mouth feel.

The treatment to inactivate or remove microbes may include thermal processing by exposure to elevated temperature, aseptic packaging, carbonation, ozonation, radiation, ultra violet light, high pressure processing, filtration, membrane permeation, pulsed electric field, sonication, and combinations thereof. Typically, the treatment for microbe inactivation may be carried out in the individual serving package used for storage and handling of the carbonated protein drink. Testing has shown that for microbe inactivation carried out in the individual serving package, plate count for microbes is negligible and typically zero after a storage period of more than 18 months at temperatures ranging between 35° F. and about 75° F.

In one embodiment, thermal processing is not used to inactivate microbes. In this embodiment the microbial inactivation is due to the addition of carbon dioxide to the protein drink. As previously described, the $CO_2$ may inhibit microbial growth by the displacement of $O_2$ by $CO_2$, by lowering the pH of the carbonated protein beverage by the dissolution of $CO_2$ and formation of carbonic acid, and by a direct effect of $CO_2$ on the metabolism of microorganisms.

In one embodiment, the carbonated protein beverage/drink provided herein is prepared using carbonation alone to inactivate active microbes and without using another method to inactivate active microbes. In non-limited exemplary embodiments disclosed in the Examples, non-pasteurized carbonated protein drinks having remarkable shelf life showed a reduction in the yeast count after packaging and storage (Example 17), demonstrating the effectiveness of using carbonation alone to inactivate the active microbes and without using another method to inactivate active microbes. In non-limited exemplary embodiments disclosed in the Examples, non-pasteurized carbonated protein drinks having remarkable shelf life wherein substantial solubility of the protein is maintained in the beverage composition and wherein the protein beverage is essentially free of active microbes known to be harmful to human health, both at the time of packaging of the protein beverage and for time periods of at least 18 months after packaging and up to at least 30 months after packaging, can be prepared using manufacturing and containerization methods that include, but are not limited to, adding carbonation to the container prior to sealing the container. It is understood that the target level of carbonation may be determined by one of skill in the art based on one or more factors including, but not limited to, the level and method of carbonation that is effective to inactivate active microbes, the level and method of carbonation that provides the desired taste and mouth feel for the drink, and the intended use of the drink.

In another embodiment, thermal processing is not used to inactivate microbes. In this embodiment the microbial inactivation is due to high pressure processing (HPP) of the protein drink. The HPP may be applied to the protein drink prior to carbonation and packaging, after carbonation and prior to packaging, or after carbonation and packaging. The HPP may also be used for a protein drink that is not carbonated. Various types of HPP equipment systems may be used, such as those produced by Avure Technologies of 22408 66$^{th}$ Avenue South, Kent, Wash. 98032, Elmhurst Research, Inc. of 60 Loudonville Rd., Albany, N.Y. 12204, and NC Hyperbaric of 28760 Tres Cantos, Madrid, Spain.

The HPP may be achieved by placing the protein beverage in a container within a water (or other pressure-transmitting fluid) filled pressure vessel, closing the vessel, and increasing the pressure exerted upon the container by pumping more water into the pressure vessel by way of an external pressure intensifier. The elevated pressure may be held for a specific period of time, then it may be decreased. Pressure levels of about 600 MPa at 25° C. may typically be enough to inactivate vegetative forms of microorganisms, such as non-spore forming pathogens, vegetative bacteria, yeast and molds. The HPP may be carried out by the method described in U.S. Pat. No. 6,635,223 B2 to Maerz, issued Oct. 21, 2003, entitled "Method for inactivating microorganisms using high pressure processing".

In another embodiment, thermal processing is not used to inactivate microbes. In this embodiment the microbial inactivation is due to the combined effects of the addition of carbon dioxide to the protein drink and HPP of the carbonated protein drink. The HPP may be applied to the carbonated protein drink prior to packaging or after packaging.

In other embodiments, thermal processing is not used to inactivate microbes. In these embodiments the microbial inactivation may be due to carbonation, aseptic packaging, ozonation, radiation, ultra violet light, HPP, membrane permeation, pulsed electric field, sonication, combinations thereof and others.

In yet another embodiment of the invention, thermal processing is used to inactivate microbes. The bulk beverage is pasteurized in a manner common to the beverage and fruit juice industries known as "hot-fill", where product is thermally processed in a continuous flow with a maximum temperature of about 160° F. to about 200° F. with a holding time at that maximum temperature ranging from about 15 seconds to about 3 seconds. Product is cooled slightly to about 160° F. to about 185° F. just prior to being filled into glass or plastic containers designed for hot-fill.

Continuous process method has several advantages over the vat method, the most important being time and energy saving. For most continuous processing, a high temperature short time (HTST) pasteurizer is used. The heat treatment is accomplished using a plate heat exchanger. This piece of equipment consists of a stack of corrugated stainless steel plates clamped together in a frame. There are several flow patterns that can be used. Gaskets are used to define the boundaries of the channels and to prevent leakage. The heating medium can be vacuum steam or hot water.

In one embodiment, the carbonated protein beverage/drink provided herein is prepared using manufacturing and containerization methods such that the drink is carbonated in the container prior to sealing the container. In certain embodiments, containers are filled with uncarbonated protein beverage composition, the composition is carbonated to the desired level, and the container is sealed as soon as possible after carbonation. In certain embodiments, sealed containers of carbonated protein beverage/drink are then thermally processed using tunnel pasteurization in which the sealed containers pass through a heat tunnel for a fixed amount of time, for example on a conveyer belt. Non-limiting embodiments of use tunnel pasteurization, as disclosed in the Examples, include cold-filling cans with non-carbonated protein beverage composition, carbonating the beverage composition in the can to a level between about 2.0 to about 2.5 volumes $CO_2$, sealing the can, and tunnel pasteurizing cans at 143° F. (61.7° C.) for about 10 minutes by means of a conveyer-belted heat tunnel. In other embodiments, sealed containers of carbonated protein beverage/drink do not undergo any further thermal or non-thermal processing, and these containers of non-pasteurized carbonated protein beverage/drink are ready for storage, transport, and consumption.

In one embodiment, manufacturing and containerization of the carbonated protein beverage/drink are carried out under controlled temperature conditions such as refrigeration. In another one embodiment, the carbonated protein beverage/drink provided herein is prepared at using manufacturing and containerization (packaging) methods that allow processing at ambient temperature. In non-limiting exemplary embodiments such as disclosed in the Examples, manufacturing may include the use of acidified concentrated protein that may be transported to the beverage manufacturing facility, where the acidified concentrated protein remains stable until used for manufacturing, followed by mixing, filling of containers, carbonation in the container, and sealing of containers. In non-limiting exemplary embodiments such as disclosed in the Examples, manufacturing may include the use of acidified concentrated protein such as acidified aqueous whey protein at about 21.5% (w/w) according to the present embodiments, that is stable for 7-10 days at room temperature (about 18.3° C.) for transportation from production site to beverage manufacturing plant, but also if refrigerated around 4° C., the 21.5% (w/w) aqueous whey protein isolate can be stored for about a month prior to adding the acidified aqueous whey protein isolate into the protein beverage manufacturing process. Ambient temperature for mixing and containerization may vary according to season and availability of temperature controls, and typically range from about 40° F. to 80° F., more typically from about 40° F. to about 60° F. Containerization of the carbonated protein beverage/drink provided herein, including filling, carbonation in the container, and sealing of containers, may occur at speeds of up to about 1000 cans per minute, or about 15 cans per second.

A protein beverage of an embodiment of the invention may further contain additional additives to: enhance the nutritional value (other than those particularly added for energy generation enhancement); aid in protection of the muscular system and joints during physical activity; add to the flavor value of the beverage; or, to provide a desired appearance of the beverage, provided that the additional agent is stable in the beverage. In an embodiment of the invention the protein beverage may be consumed as a meal replacement. Examples of additional agents which enhance nutritional value include nutrients such as vitamins, minerals (including calcium or a calcium derivative), herbal supplements, concentrated plant extracts, glucosamine, amino acids, fatty acids, and fiber. The examples include the following: vitamins such as vitamin A, vitamin C, vitamin D, and vitamin E, by way of example and not by way of limitation; minerals such as zinc, chromium, iron, calcium, magnesium (previously mentioned), and potassium, by way of example and not by way of limitation; herbal supplements such as ginseng, gingko biloba, saw palmetto, green tea, and hoodia gordonii, by way of example and not by way of limitation; amino acids, such as L-Glutamine, L-Arginine, Taurine, creatine, N-acetyl-cystine, N-acetyl-carnitine, L-Leucine, L-isoleucine and L-valine, by way of example and not by way of limitation; fatty acids such as docosahexaenonic acid (DHA), eicosapentaeonic acid (EPA), Omega 3's and Omega 6's, by way of example and not by way of limitation; and fiber such as oligofructopolysaccharides, corn fiber, oat fiber, and flax fiber, by way of example and not by way of limitation.

Concentrated plant extracts, which may be high in vitamins and nutrients, while low in calories, may be added. These extracts may be derived from fruits, herbs, vegetables, and other plants which may have high content of nutritional components. Production of the extracts may be carried out by conventional methods, such as those described in detail in U.S. Pat. No. 6,620,452 B1; however, these extracts may be commercially available. One example of these extracts may be the extract derived from green tea, called Sunphenon 90M, from Taiyo International, Minneapolis, Minn. 55416, USA.

An example of an additive to aid in protection of the muscular system and joints during physical activity may be a hyperimmune milk protein concentrate which works in combination with the edible nutritional protein already present in the protein beverage. The hyperimmune milk protein concentrate may be manufactured in the manner described in detail in U.S. Pat. No. 5,650,175. One example of the hyperimmune milk protein is available from Stolle Milk Biologics of Chicago, Ill. under the trade name MicroLactin™ and distributed by Humanetics Corporation of Eden Prairie, Minn., by way of example and not by way of limitation. The hyperimmune milk protein concentrate may be derived from whey, such as a fractionization from whey. However, the hyperimmune milk protein concentrate may exhibit functional properties similar to casein. Use of a hyperimmune milk protein concentrate in the beverage formulation typically results in a beverage which exhibits turbidity.

The flavoring agent or agents may provide a fruit flavor, cola flavor, vanilla flavor, or a chocolate flavor, by way of example and not by way of limitation. Other flavorings, such as, by way of example, and not by way of limitation, Stevia leaf extract and Lo Han Guo. Sweeteners, natural or synthetic, such as sucrose, sucralose, aspartame, and/or acesulfame potassium, neotame, polydextrose, glycerin, sorbitol, high fructose corn syrup, corn syrup, saccharin, honey, molasses, maple syrup, and xylitol, may be used, by way of example and not by way of limitation. Coloring agents may be added. Agents such as citric acid, fumaric acid, adipic acid, tartaric acid, and in some instances lactic acid may be added to adjust for tartness.

Additional ingredients in the form of analgesics, such, for example, as aspirin may be added in specialized product applications. Mild stimulants other than the foregoing mentioned caffeine, such, for example, as green tea may be added. Relaxants, such, for example, as melatonin may also be added.

To provide stability, the protein drink may include an anti-foaming agent such as dimethylpolysiloxane, and a pH adjusting agent such as phosphoric acid, citric acid, tartaric acid, fumaric acid, adipic acid, and in some instances lactic acid. Excess citric acid and malic acid can cause tartness and astringency of taste and produce an unpalatable beverage that has an unacceptable mouth-feel when consumed. Phosphoric acid is presently preferred as a pH adjusting agent, as the quantity required to obtain a desired pH may be typically less, and the taste of the beverage may be less affected by the pH adjustment. The adjusted pH of the protein drink typically ranges from about 2.0 to about 5.5, more typically from about 2.0 to about 3.4. The protein drink may be prepared without the use of phosphoric acid and using only one or more organic acids such as citric acid, malic acid, tartaric acid, alone or in combination, if there is an interest in avoiding inorganic or mineral edible acids, and/or an interest in promoting the use of organic acids in the product. To further provide stability, the protein drink may be formulated to essentially exclude a component which includes caseinate. Caseinate may not be stable at the pH of the protein beverage.

One or more preservatives may be added to the protein beverage, such as, for example, one or more chemical preservatives, one or more natural preservatives, a combination thereof, or others. Examples of chemical preservatives which may be used include, for example, a sorbate or a benzoate. Examples of natural preservatives which may be used include, for example, nisin or natamycin, which may be obtained commercially from a food ingredient supplier, such as Danisco A/S Langebrogade 1 DK-1001 Copenhagen. In certain embodiments, a carbonated protein beverage having remarkable shelf life may be prepared without the use of preservatives as provided herein.

The protein drink may be prepared by admixing in water, an anti-foaming agent, an amount of a pH adjusting agent to provide a pH of about 2 to about 5.5 and an amount of protein sufficient to provide a final protein content in the beverage ranging from about 0.01% by weight to about 8% by weight protein. In certain embodiments, a carbonated protein beverage having remarkable shelf life may be prepared without the use of preservatives as provided herein.

The protein drink may be carbonated by adding carbon dioxide to the admixture in an amount sufficient to obtain a carbonated protein beverage where the amount of carbonation present in the beverage ranges from about 0.1 volumes to about 6 volumes per volume of liquid admixture, more typically between about 1 volume to about 5 volumes per volumes of liquid, even more typically between about 2 volumes to about 4 volumes per volumes of liquid. In some embodiments of the method, the carbon dioxide may be added in the form of sterile carbonated water. In other embodiments, sterile carbon dioxide is bubbled through the liquid admixture until the desired amount of carbon dioxide is present. In either embodiment, the final protein content of the beverage ranges from about 0.01% by weight to about 8% by weight, and the carbonation ranges from about 0.1 volumes to about 6 volumes. In other embodiments, the final protein content of the beverage ranges from about 2% by weight to about 8% by weight and the carbonation ranges from about 0.1 volumes to about 6 volumes. In other embodiments, the final protein content of the beverage ranges from about 2% by weight to about 8% by weight and the carbonation ranges from about 1 volume to about 5 volumes per volumes of liquid. In other embodiments, the final protein content of the beverage ranges from about 2% by weight to about 8% by weight and the carbonation ranges from about 2 volumes to about 4 volumes per volumes of liquid.

The protein drink may be prepared by admixing in water, an anti-foaming agent, an amount of a pH adjusting agent to provide a pH of about 2 to about 4.6, an amount of juice to provide a final juice content in the beverage ranging from about 0% by weight to about 100% by weight juice, and an amount of protein sufficient to provide a final protein content in the beverage ranging from about 0.01% by weight to about 8% by weight protein; heating the admixture to a temperature ranging from about 140° F. to about 188° F. for a time period adequate to inactivate microbes which may be present in the admixture; cooling the admixture to a temperature of about 40° F. or less.

The protein beverage may be carbonated by adding carbon dioxide to the admixture in an amount sufficient to obtain a carbonated protein beverage where the amount of carbonation present in the beverage ranges from about 0.1 volumes to about 6 volumes per volume of liquid admixture. In some embodiments of the method, the carbon dioxide is added in the form of sterile carbonated water. In other embodiments, sterile carbon dioxide is bubbled through the liquid admixture until the desired amount of carbon dioxide is present. In either embodiment, the final juice content of the beverage ranges from about 0% by weight to about 100% by weight, the final protein content of the beverage ranges from about 0.01% by weight to about 8% by weight, and the carbonation ranges from about 0.1 volumes to about 6 volumes. In other embodiments, the final juice content of the beverage ranges from about 0% by weight to about 98% by weight, the final protein content of the beverage ranges from about 2% by weight to about 8% by weight, and the carbonation ranges from about 0.1 volumes to about 6 volumes.

The protein drink may also be prepared in a manner similar to that described above, with the additional step of HPP to inactivate microbes in the protein beverage. The HPP step may take place prior to the addition of carbon dioxide or after the addition of carbon dioxide. The carbonated protein beverage may be treated with HPP prior to packaging or after packaging in containers.

The protein drink may also be prepared in a manner similar to that described above, with the exception that the heating of the admixture may be carried out after addition of the carbonation rather than prior to addition of the carbonation. This requires that provisions be made to maintain the carbonation during the heating and cooling process. We have discovered that it is possible to maintain the carbonation if the carbonated protein beverage may be packaged in individual size containers and the containers of beverage may then be processed for microbe inactivation. In some embodiments, the protein beverage is In another embodiment, the protein drink may include about 0% alcohol by volume to about 15% alcohol by volume. Typically, the percent alcohol by volume ranges from about 4% by volume to about 8% by volume. The alcohol used may be derived from malt based, fermented from grain.

The clarity, or turbidity, of the protein drink/beverage provided herein may be affected by the beverage formula, but does not show a strong difference between non-carbonated (still) and carbonated versions of the same formula. In non-limiting exemplary embodiments such as those disclosed in the Examples, the effect of various ingredients on the clarity was tested using a portable turbidity meter to test samples of protein beverage drinks having different formulas, and to test samples of carbonated and non-carbonated (still) protein beverage drinks having identical formulas. As shown in the following table for whey protein beverages prepared using WPIaq, the still and carbonated versions of the same formula did not have significantly different turbidity measurements, but different formulas produced different turbidity measurements. In certain embodiments, fruit-flavored beverages can have low turbidity and appear almost clear in both still or carbonated versions, with NTU values of about 30 or less. In other embodiments, whey protein beverages may have NTU values above 30, in some embodiments nearly 100. Without wishing to be limited by this theory, in the particular embodiments disclosed in the Examples, the formulas with NTU values of about 30 or less contain predominantly artificial flavors, colors and sweeteners, whereas the formulas with NTU values greater than 30 contain more natural flavors, and contain natural colorants such as colorant with a caramel component, and colorant with a turmeric component. It is understood that one of skill in the art can determine acceptable beverages based on a variety of factors including, but not limited to, the desired NTU value for a particular beverage, a particular market, or a particular use.

TABLE 1

| Example No. & Beverage Formula | Still non-carbonated) beverage, NTU | Carbonated beverage, NTU |
|---|---|---|
| Example Seventeen: Natural lemon lime carbonated protein beverage, pH 2.95, protein about 4.3% (w/w) | NA | 68.7 |
| Example Eighteen - Fruit-flavored beverage, natural and artificial flavors, colors, and sweeteners, pH 3.1, protein about 4.2% (w/w) | 20.1 ± 0.5 | 25 |

TABLE 1-continued

| Example No. & Beverage Formula | Still non-carbonated) beverage, NTU | Carbonated beverage, NTU |
|---|---|---|
| Example Nineteen - Fruit-flavored beverage, natural and artificial flavors, colors, and sweeteners, pH 3.0, protein about 3.4% (w/w) | 24.8 | 29.5 |
| Example Twenty - Fruit-flavored beverage, natural and artificial flavors, colors, and sweeteners, pH 3.0, protein about 2.8% (w/w) | 19.2 | 23.4 |
| Example Twenty-One - Lemon Lime Recovery Carbonated Protein Beverage; natural and artificial fruit flavors, colors, and sweeteners, pH 3.0, protein about 5.2% (w/w) | NA | 97 |
| Example Twenty-Two: Lemon Lime Energy Carbonated Protein Beverage; natural and artificial fruit flavors, colors, and sweeteners, pH 3.0, protein about 3.3% (w/w) | NA | 95.8 |

In other embodiments, the protein drink may be prepared in concentrated forms, which may be diluted prior to consumption with a liquid, such as, for example, but not by way of limitation, water, fruit juice, vegetable juice, tea, alcohol, coffee, milk, soy milk, rice milk, almond milk, a combination thereof, or others. Certain embodiments include a liquid used for dilution, which may be a carbonated liquid or a still liquid. If a still liquid is used, the beverage may be carbonated with carbon dioxide gas after dilution.

An embodiment of a protein beverage concentrate may be a concentrated syrup, which may include about 0% by weight to about 60% by weight of juice concentrate, wherein the juice concentrate has a Brix value of about 20° Brix to about 75° Brix, and about 0.02% by weight to about 75% by weight protein. Another embodiment of a protein beverage concentrated syrup may include about 0% by weight to about 60% by weight of juice concentrate, wherein the juice concentrate has a Brix value of about 20° Brix to about 75° Brix, and about 4% by weight to about 75% by weight protein. Such protein beverage concentrated syrup may, at the time of packaging and during subsequent storage without refrigeration, maintain substantial solubility of the protein. Such embodiment of the protein beverage concentrated syrup may also, at the time of packaging and during subsequent storage, be essentially free of pathogenic microbes known to be harmful to human health.

The protein beverage concentrated syrup may include about 0% by weight of juice concentrate and about 0.01% by weight to about 49% by weight protein.

The juice concentrate used for the protein beverage concentrated syrup may be derived from a single fruit juice, a single vegetable juice, fruit juice blends, vegetable juice blends, or fruit and vegetable juice blends may be used. Examples of a few of the many specific juices which may be used may include, but are not limited to, juice from alfalfa sprouts, apples, apricots, avocados, bamboo shoots, bananas, beans, bean sprouts, beets, berries of all types, cabbage, carrots, celery, cherries, cucumbers, currants, dates, figs, grapefruits, grapes, guava, kiwi, kumquat, lemons, limes, lychee fruit, mandarin, mango, melons of all types, nectarines, noni, oranges, papaya, passion fruit, peaches, pears, pineapples, plums, pomegranates, prunes, radishes, rhubarbs, rutabagas, seaweed, squash, tangelo, tangerines, tomatoes, and/or turnips, as well as combinations thereof; however, any type of juice may be used.

The protein used for the protein beverage concentrated syrup embodiment may be essentially free from caseinate. In some embodiments, the essentially caseinate free protein may have some caseinate or may be a whey protein, of the kind previously described herein. An essentially caseinate free protein may be a whey protein which may be derived from whey protein isolate or whey protein concentrate, although other whey protein preparations may also be used, such as, for example, but not by way of limitation, a whey protein extract or a whey protein hydrolysate. The whey protein isolate may be an aqueous whey protein isolate, with a whey protein concentration of about 0.01% by weight to about 49% by weight. The whey protein concentrate may be an aqueous whey protein concentrate. In addition to being essentially free from caseinate, the protein may be essentially free of fat and lactose.

Whey protein isolate may be obtained by removing sufficient non-protein constituents from whey by membrane filtration or ion exchange absorption, so that the finished dry product may contain about 90% by weight or more whey protein, and little, if any, fat, cholesterol, or carbohydrates (e.g., lactose). Prior to concentration and spray drying, aqueous whey protein isolate (WPIaq) may have a whey protein concentration of about 0.01% by weight to about 49% by weight, and may also be essentially free of fat, cholesterol, and carbohydrates.

Aqueous whey protein isolate (WPIaq) is collected at a concentration by weight of about 20% to about 35% actual whey protein.

WPIaq is diluted with water to a protein concentration of about 1% to about 24%, representing a range from single-strength beverage protein level to a concentrate suitable for acidification, nutrient addition, transport to a beverage manufacturing facility and subsequent dilution, thermal processing, and containerization.

The protein used for the protein beverage concentrated syrup may also include any edible protein, other than whey protein, such as, for example, but not by way of limitation, milk serum protein, casein, lactalbumin, serum albumin, glycomacropeptide, soy protein, rice protein, pea protein, canola protein, wheat protein, hemp protein, zein, flax protein, egg white protein, ovalbumin, gelatin protein, hydrolyzed collagen, any combination thereof, or others.

The protein used for the protein beverage concentrated syrup may also include a combination of a whey protein, of the kind previously described herein, and an edible protein, other than whey protein, such as for example, but not by way of limitation, milk serum protein, casein, lactalbumin, serum albumin, glycomacropeptide, soy protein, rice protein, pea protein, canola protein, wheat protein, hemp protein, zein, flax protein, egg white protein, ovalbumin, gelatin protein, hydrolyzed collagen, any combination thereof, or others.

Typically the pH of the aqueous protein (isolate or concentrate) may be adjusted with an appropriate pH adjusting agent to match the pH of the beverage composition prior to mixing the protein with the beverage composition.

The protein beverage concentrated syrup may further include about 0% by weight to about 100% by weight filler, wherein the filler may be water, a sweetener, a flavoring agent, a coloring agent, an anti-foaming agent, a nutrient, calcium or a calcium derivative, an energy-generating additive, an herbal supplement, a concentrated plant extract, a preservative, combinations thereof, or others.

The protein beverage concentrated syrup may be treated to inactivate microbes by pasteurization, aseptic packaging, carbonation, ozonation, radiation, ultraviolet light, high pressure processing, membrane permeation, pulsed electric field, sonication, combinations thereof, or other microbial inactivation treatments. In some embodiments, the protein beverage concentrated syrup may be carbonated and packaged as a carbonated syrup having remarkable shelf life wherein substantial solubility of the protein is maintained in the beverage composition and wherein the protein beverage is essentially free of active microbes known to be harmful to human health, both at the time of packaging of the protein beverage and for a time period of at least 18 months after packaging.

The protein beverage concentrated syrup may range from about a two-fold syrup to about a twenty-five-fold syrup. A further embodiment of the protein beverage concentrated syrup may be prepared as about a five-fold syrup, wherein one part protein beverage concentrated syrup may be diluted with four parts liquid to prepare a protein beverage. The liquid may be any suitable liquid for human consumption, such as, for example, but not by way of limitation, water, fruit juice, vegetable juice, tea, alcohol, coffee, milk, soy milk, rice milk, almond milk, combinations thereof, or others.

In some embodiments the protein beverage made from the protein beverage concentrated syrup may be a carbonated beverage. The carbonation of the protein beverage may range from about 1.0 volumes to about 3.5 volumes per volume of beverage, preferably, about 1.6 to about 3.5 volumes per volumes of beverage; more preferably, about 1.6 to about 3.0 volumes per volume of beverage.

The carbonation may be added in the form of carbonated liquid, such as, for example, but not by way of limitation, carbonated water. The carbonation may be added by bubbling sterile carbon dioxide through the protein beverage until the desired amount of carbon dioxide is present. The carbonation may also be added by the addition of any edible carbonation source, such as, for example, but not by way of limitation, a carbonate material capable of reacting with an acid or mixture of acids to effect the release of carbon dioxide upon contact with water. See U.S. Patent Application Publication No. 20020136816, the disclosure of which is incorporated herein by reference.

In some embodiments the protein beverage concentrated syrup may be used by an individual, and may be packaged in single use servings or in small bottles, such as, for example, but not by way of limitation 50 ml-1500 ml bottles suitable for household use. In some embodiments, the protein beverage concentrated syrup may be packaged as a carbonated syrup in single use servings or in small bottles, the carbonated syrup having remarkable shelf life wherein substantial solubility of the protein is maintained in the beverage composition and wherein the protein beverage is essentially free of active microbes known to be harmful to human health, both at the time of packaging of the protein beverage and for a time period of at least 18 months after packaging. In other embodiments the protein beverage concentrated syrup may be packaged in larger containers suitable for use in a food services beverage dispenser or in a restaurant or bar beverage dispenser. In yet other embodiments the protein beverage concentrated syrup may be produced in large batches for use in the preparation of a protein beverage at a bottling plant or other commercial beverage preparation facility.

The protein beverage concentrated syrup may be prepared by admixing a juice concentrate having a Brix value of about 20° Brix to about 75° Brix, to achieve a percent by weight of juice concentrate of about 0% by weight to about 60% by weight and a protein to achieve a percent by weight of protein in the admixture of about 0.05% by weight to about 60% by weight, thereby obtaining an admixture. The protein beverage concentrated syrup may be packaged in a container which may be stored at room temperature.

In one embodiment the protein beverage concentrate may be a concentrated powder, which may be prepared as a dry preparation, such as, for example, but not by way of limitation, a powder, granular, crystal, or other type of dry particle preparations. The dry preparations may be prepared by mixing the various ingredients as described above to form a concentrated syrup, then drying the syrup to a dry powder form by conventional drying methods, such as, for example, but not by way of limitation, lyophilization (freeze drying), spray drying, fluid bed drying, drum drying, combinations thereof, or others.

In many of the Examples described below, the protein used is whey protein, since this protein provides the taste and offers other nutritional advantages of the kind previously discussed. However, one skilled in the art will understand that by adjusting the pH to extend to higher or lower pH ranges and/or producing a carbonated protein drink having a protein content at other positions in the range of about 0.01% to about 15%, other proteins such as milk protein, soy protein, lactalbumin, serum albumin, glycomacropeptide, rice protein, pea protein, canola protein, wheat protein, hemp protein, zein, flax protein, egg white protein, ovalbumin, gelatin protein, hydrolyzed collagen, combinations thereof, or others, by way of example and not by way of limitation, may also be used, alone or in combination, to create the present protein beverage. Hydrolysates and derivatives of these common protein sources may also be used in embodiments contemplated by this disclosure.

In most of the Examples described below, the method used to inactivate microbes is pasteurization, however other methods may be used, such as aseptic packaging, carbonation, ozonation, radiation, ultra violet light, high pressure processing, membrane permeation, pulsed electric field, sonication, combinations thereof, or others.

EXAMPLES

Example One

The following example describes use of the aqueous protein ingredient for the production of approximately 10,000 liters of a fruit-flavored protein beverage with a whey protein concentration of 3.33%, approximately equal to the total protein concentration in bovine milk. The weight of the batch is approximately 10,350 kg.

Temperature should be maintained in the range of 40-50 degrees Fahrenheit during the acidification process.

1035 kg of Aqueous Whey Protein at 33.3% (w/w) total protein is diluted by addition and slow mixing of an equal weight of purified water to yield 2070 kg of aqueous 16.65% whey protein.

Approximately 50 kg of 85% phosphoric acid is added at a rate of about 5 kg/minute with constant mixing with the endpoint being a target pH of 3.2±0.2.

Acidified aqueous protein is transferred into two bulk totes designed for palletized food-grade liquid transport. The totes typically have a capacity of 250-300 gallons, and in this case the totes contain a total of about 450 gallons.

Bulk transport should be conducted in a manner by which temperature can be maintained at 40-60 degrees.

After arrival at a beverage manufacturing facility, the protein is transferred to a batch mixing tank of appropriate volume (in this example, 3,000-5,000 gallon capacity).

Additional water is added to reach approximately 99% of finished volume, after which flavors, colors, sweeteners, and other desired ingredients are added. Final pH of 3.2±0.2 is achieved by addition of a single organic acid such as citric acid, malic acid, tartaric acid, a combination thereof, or other organic acids.

The bulk beverage is pasteurized in a manner common to the beverage and fruit juice industries known as "hot-fill", where product is thermally processed in a continuous flow with a maximum temperature of 160-200° F. with a holding time at that maximum temperature ranging from 15 seconds to about 3 seconds. Product is cooled slightly to 160-185° F. just prior to being filled into glass or plastic containers designed for hot-fill.

Example Two

An alternate method of producing such a beverage can be performed by the full dilution and ingredient addition being conducted at the site of protein production, followed by bulk transport of finished beverage to the beverage processor/bottler. This method is considered to be more costly due to transport of additional water and would generally be avoided unless the beverage processor was unable to complete the batch preparation.

Example Three

Another alternate method of producing such a beverage consists of transport of the highly concentrated aqueous protein in its undiluted and unacidified state, after which these steps are performed at the site of beverage processing and container filling.

Example Four

A fourth example involves the use of the aqueous protein stream from membrane-filtration isolation of soy protein. In this example, addition of antimicrobial agents at the beginning of the process is recommended, as the aqueous soy protein would not be acidified either as a concentrate or as a finished beverage due to its insolubility in acid solutions. Temperature should be maintained at 30-42° F. until final beverage processing using aseptic technology for sterilization and container filling.

Example Five

The following example describes use of the aqueous protein ingredient for the production of approximately 385 liters of a water based, fruit-flavored protein beverage with a whey protein concentration of about 3.35%, approximately equal to the total protein concentration in bovine milk. The weight of the batch is approximately 387 kg.

Temperature should be maintained in the range of 40-50 degrees Fahrenheit during the acidification process.

Approximately 3.6 kg of dietary fiber (such as VitaSugar™ brand fiber, from Bio Neutra, located in Edmonton, Canada) is diluted by addition and slow mixing into approximately 316.3 kg of purified water. Alternatively, a small amount, such as approximately 1 kg or less, of the dietary fiber may be reserved to make a "premix" with other dry ingredients that are added in small amounts of less than 1 kg.

Approximately 64.8 kg of an aqueous whey protein isolate (such as the aqueous whey protein isolate available from Trega, located in Wisconsin) at about 20.0% (w/w) total protein is diluted by addition and slow mixing to the water and fiber admixture. The admixture is mixed well, however care is taken to prevent air incorporation into the admixture, which causes the undesirable effect of foaming. Note that the concentration of whey protein in the aqueous whey protein preparation may vary between batches and/or manufacturers, and thus the amount of aqueous whey protein isolate and water added should be adjusted accordingly to achieve the desired final protein concentration in the finished beverage.

The pH of the admixture is checked, and if higher than 3.22 phosphoric acid is added at a rate of about 5 kg/minute with constant mixing with the endpoint being a target pH of about 3.2.

Approximately 0.39 kg of malic acid and approximately 0.39 kg of citric acid are added to the admixture and the pH is recorded after mixing well.

Approximately 81.24 grams of sucralose and approximately 154.75 grams of color, such as red color 2479 are added to the admixture. Alternatively, the sucralose and color may be premixed with approximately 1 kg or less of dietary fiber (mentioned above) to aid in dispersion and wetting of the sucralose and color.

Approximately 386.87 grams of natural pomegranate flavor (such as the natural pomegranate flavor available from Virginia Dare of Brooklyn, N.Y.) and approximately 773.74 grams of natural fruit punch flavor (such as the natural fruit punch flavor available from Virginia Dare of Brooklyn, N.Y.) are added to the admixture. After mixing well the pH is again recorded.

The bulk beverage is pasteurized in a manner common to the beverage and fruit juice industries known as "hot-fill", where product is thermally processed in a continuous flow with a maximum temperature of 160-200° F. with a holding time at that maximum temperature ranging from 15 seconds to about 3 seconds. Product is cooled slightly to 160-185° F. just prior to being filled into glass or plastic containers designed for hot-fill.

Example Six

The following example describes use of the aqueous protein ingredient for the production of approximately 385 liters of a water based, fruit-flavored protein beverage with a whey protein concentration of about 3.35%, approximately equal to the total protein concentration in bovine milk. The weight of the batch is approximately 387 kg.

Temperature should be maintained in the range of 40-50 degrees Fahrenheit during the acidification process.

Approximately 3.6 kg of dietary fiber (such as VitaSugar™ brand fiber, from Bio Neutra, located in Edmonton, Canada) is diluted by addition and slow mixing into approximately 315.6 kg of purified water. Alternatively, a small amount, such as approximately 1 kg or less, of the dietary fiber may be reserved to make a "premix" with other dry ingredients that are added in small amounts of less than 1 kg.

Approximately 64.8 kg of an aqueous whey protein isolate (such as the aqueous whey protein isolate available from Trega, located in Wisconsin) at about 20.0% (w/w) total protein is diluted by addition and slow mixing to the water and fiber admixture. The admixture is mixed well, however care is taken to prevent air incorporation into the admixture, which causes the undesirable effect of foaming. Note that the concentration of whey protein in the aqueous whey protein preparation may vary between batches and/or manufacturers, and thus the amount of aqueous whey protein isolate and water added should be adjusted accordingly to achieve the desired final protein concentration in the finished beverage.

The pH of the admixture is checked, and if higher than 3.22 phosphoric acid is added at a rate of about 5 kg/minute with constant mixing with the endpoint being a target pH of about 3.2.

Approximately 0.39 kg of malic acid and approximately 0.39 kg of citric acid are added to the admixture and the pH is recorded after mixing well.

Approximately 81.24 grams of sucralose and approximately 96.72 grams of color, such as purple color 2748 are added to the admixture. Alternatively, the sucralose and color may be premixed with approximately 1 kg or less of dietary fiber (mentioned above) to aid in dispersion and wetting of the sucralose and color.

Approximately 1160.6 grams of natural blueberry flavor (such as the natural blueberry flavor available from Virginia Dare of Brooklyn, N.Y.) and approximately 773.74 grams of natural raspberry flavor (such as the natural raspberry flavor available from Virginia Dare of Brooklyn, N.Y.) are added to the admixture. After mixing well the pH is again recorded.

The bulk beverage is pasteurized in a manner common to the beverage and fruit juice industries known as "hot-fill", where product is thermally processed in a continuous flow with a maximum temperature of 160-200° F. with a holding time at that maximum temperature ranging from 15 seconds to about 3 seconds. Product is cooled slightly to 160-185° F. just prior to being filled into glass or plastic containers designed for hot-fill.

Example Seven

The following example describes use of the aqueous protein ingredient for the production of approximately 385 liters of a water based, green tea-flavored protein beverage with a soy protein concentration of about 3.35. The weight of the batch is approximately 387 kg.

Temperature should be maintained in the range of 40-50 degrees Fahrenheit during the acidification process.

Approximately 3.6 kg of dietary fiber (such as VitaSugar™ brand fiber, from Bio Neutra, located in Edmonton, Canada) is diluted by addition and slow mixing into approximately 301.7 kg of purified water. Alternatively, a small amount, such as approximately 1 kg or less, of the dietary fiber may be reserved to make a "premix" with other dry ingredients that are added in small amounts of less than 1 kg.

Approximately 77.6 kg of an aqueous soy protein isolate at about 16.7% (w/w) total protein is diluted by addition and slow mixing to the water and fiber admixture. The admixture is mixed well, however care is taken to prevent air incorporation into the admixture, which causes the undesirable effect of foaming. Note that the concentration of soy protein in the aqueous soy protein preparation may vary between batches and/or manufacturers, and thus the amount of aqueous soy protein isolate and water added should be adjusted accordingly to achieve the desired final protein concentration in the finished beverage.

The pH of the admixture is checked, and if higher than 6.0 phosphoric acid is added at a rate of about 5 kg/minute with constant mixing with the endpoint being a target pH of about 5.75.

Approximately 0.39 kg of citric acid is added to the admixture and the pH is recorded after mixing well.

Approximately 127.7 grams of Lo Han Guo sweetener is added to the admixture. Alternatively, the Lo Han Guo sweetener may be premixed with approximately 1 kg or less of dietary fiber (mentioned above) to aid in dispersion and wetting of the Lo Han Guo.

Approximately 2.32 kg of natural green tea flavor (such as the natural green tea flavor available from Virginia Dare of Brooklyn, N.Y.), approximately 773.74 grams of natural black tea flavor (such as the natural black tea flavor available from Virginia Dare of Brooklyn, N.Y.), and approximately 386.87 grams of natural lemongrass flavor (such as the natural lemongrass flavor available from Virginia Dare of Brooklyn, N.Y.) are added to the admixture. After mixing well the pH is again recorded.

The bulk beverage is pasteurized in a manner common to the beverage and fruit juice industries known as "hot-fill", where product is thermally processed in a continuous flow with a maximum temperature of 160-200° F. with a holding time at that maximum temperature ranging from 15 seconds to about 3 seconds. Product is cooled slightly to 160-185° F. just prior to being filled into glass or plastic containers designed for hot-fill.

Example Eight

The following example describes use of the aqueous protein ingredient for the production of approximately 19400 kilograms of an orange and mango flavored water based protein beverage with a whey protein concentration of approximately 5%.

Temperature should be maintained in the range of 20-25 degrees Celsius during the acidification process.

4811.24 kg of Trega Pre-acidified Aqueous Whey Protein Isolate at 20% (w/w) total protein was diluted by addition and slow mixing of 14492.42 kg of water.

Approximately 4.85 kg malic acid was added with constant mixing.

Flavors, colors, preservative, and sweeteners were added as follows: 4074.04 g sucralose sweetener, 291 g Sensient #8006 Dry Yellow #6 (orange color), 11.64 kg potassium benzoate, 15520.14 g VDare Orange PB26 natural flavor, and 31040.28 g VDare Mango SW45 natural flavor.

Final pH of 2.95 to 3.10 was achieved by addition of approximately 29.10 kg citric acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Nine

The following example describes use of the aqueous protein ingredient for the production of approximately 19400 kilograms of a grape flavored water based protein beverage with a whey protein concentration of approximately 5%.

Temperature should be maintained in the range of 20-25 degrees Celsius during the acidification process.

4811.24 kg of Trega Pre-acidified Aqueous Whey Protein Isolate at 20% (w/w) total protein was diluted by addition and slow mixing of 14522.49 kg of water.

Approximately 19.4 kg tartaric acid was added with constant mixing.

Flavors, colors, preservative, and sweeteners were added as follows: 4074.04 g sucralose sweetener, 232.80 g Sensient #7700 Dry Red #40 (red color), 11.64 kg potassium benzoate, 21340.19 g VDare Grape CS10 flavor, and 58.20 g Sensient #5601 Dry Blue #1 (blue color).

Final pH of 3.0 to 3.10 was achieved by addition of approximately 9.70 kg citric acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Ten

The following example describes use of the aqueous protein ingredient for the production of approximately 19400 kilograms of a tropical fruit flavored water based protein beverage with a whey protein concentration of approximately 5%.

4811.24 kg of Trega Pre-acidified Aqueous Whey Protein Isolate at 20% (w/w) total protein was diluted by addition and slow mixing of 14519.67 kg of water.

Flavors, colors, preservative, and sweeteners were added as follows: 4074.04 g sucralose sweetener, 194 g Sensient #7700 Dry Red #40 (red color), 11.64 kg potassium benzoate, 14550.13 g VDare Punch AN28 liquid natural flavor, and 9700.09 g VDare Punch AN27 dry flavor.

Final pH of 2.95 to 3.10 was achieved by addition of approximately 29.10 kg citric acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Eleven

The following example describes use of the aqueous protein ingredient for the production of approximately 3880 kilograms of an orange and mango flavored water based protein beverage with a whey protein concentration of approximately 3.3%.

Temperature should be maintained in the range of 20-25 degrees Celsius during the acidification process.

604.56 kg of Trega Aqueous Whey Protein Isolate at 21.50% (w/w) total protein was diluted by addition and slow mixing of 3218.57 kg of water.

Approximately 1.164 kg malic acid was added with constant mixing.

Flavors, colors, preservative, fiber, and sweeteners were added as follows: 795.41 g sucralose sweetener, 232.80 g Colormaker Orange 2733 annatto powder, 2716.02 g potassium benzoate, 36.86 kg VitaSugar fiber, 3104.03 g VDare Orange PB26 natural flavor, and 6208.06 g VDare Mango SW45 natural flavor.

Final pH of 2.95 to 3.05 was achieved by addition of approximately 5.82 kg citric acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Twelve

The following example describes use of the aqueous protein ingredient for the production of approximately 3880 kilograms of a pomegranate flavored water based protein beverage with a whey protein concentration of approximately 3.3%.

Temperature should be maintained in the range of 20-25 degrees Celsius during the acidification process.

604.56 kg of Trega Aqueous Whey Protein Isolate at 21.50% (w/w) total protein was diluted by addition and slow mixing of 3216.11 kg of water.

Approximately 2.716 kg malic acid was added with constant mixing.

Flavors, colors, preservative, fiber, and sweeteners were added as follows: 776.01 g sucralose sweetener, 388.0 g Colormaker Purple Carrot 2748 powder, 1552 g Colormaker Red Cabbage 2714 powder, 2716.02 g potassium benzoate, 36.86 kg VitaSugar fiber, 3880.04 g VDare Pomegranate natural flavor, and 7760.07 g VDare Fruit Punch natural flavor.

Final pH of 2.95 to 3.05 was achieved by addition of approximately 2.716 kg citric acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Thirteen

The following example describes use of the aqueous protein ingredient for the production of approximately 3880 kilograms of a blueberry and raspberry flavored water based protein beverage with a whey protein concentration of approximately 3.3%.

Temperature should be maintained in the range of 20-25 degrees Celsius during the acidification process.

604.56 kg of Trega Aqueous Whey Protein Isolate at 21.50% (w/w) total protein was diluted by addition and slow mixing of 3210.67 kg of water.

Approximately 1.552 kg malic acid was added with constant mixing.

Flavors, colors, preservative, fiber, and sweeteners were added as follows: 776.01 g sucralose sweetener, 1940.02 g Colormaker Red Cabbage 2714 powder, 2716.02 g potassium benzoate, 36.86 kg VitaSugar fiber, 11640.11 g VDare Blueberry natural flavor, and 7760.07 g VDare Raspberry natural flavor.

Final pH of 3.05 to 3.15 was achieved by addition of approximately 1.552 kg citric acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Fourteen A

The following example describes use of the aqueous protein ingredient for the production of approximately 3860 kilograms of a cranberry and apple flavored water based protein beverage with a whey protein concentration of approximately 1.04%.

Temperature should be maintained in the range of 20-25 degrees Celsius during the acidification process.

200.778 kg of Trega Aqueous Whey Protein Isolate at 20.0% (w/w) total protein was diluted by addition and slow mixing of 3589.67 kg of water.

Approximately 2.317 kg malic acid was added with constant mixing.

Flavors, colors, fiber, and sweeteners were added as follows: 772.22 g sucralose sweetener, 3861.11 g Mastertast freeze-dried Cranberry Fruit powder, 772.22 g Colormaker Purple Carrot 2748 powder, 772.22 g Colormaker Red Cabbage 2714 powder, 44.40 kg VitaSugar fiber, 11583.32 g VDare Cranberry BX09 natural flavor, and 5019.44 g VDare Apple AUO2 natural flavor.

Final pH of 3.05 to 3.15 was achieved by addition of approximately 1158.33 g Ascorbic acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Fourteen B

The following example describes use of the aqueous protein ingredient for the production of approximately 3880 kilograms of an orange and mango flavored water based protein beverage with a whey protein concentration of approximately 3.3%.

Temperature should be maintained in the range of 20-25 degrees Celsius during the acidification process.

604.56 kg of Trega Aqueous Whey Protein Isolate at 21.50% (w/w) total protein was diluted by addition and slow mixing of 3218.57 kg of water.

Approximately 1.164 kg malic acid was added with constant mixing.

Flavors, colors, preservative, fiber, and sweeteners were added as follows: 795.41 g sucralose sweetener, 232.80 g Colormaker Orange 2733 annatto powder, 2716.02 g potassium benzoate, 36.86 kg VitaSugar fiber, 3104.03 g VDare Orange PB26 natural flavor, and 6208.06 g VDare Mango SW45 natural flavor.

Final pH of 2.95 to 3.05 was achieved by addition of approximately 5.82 kg citric acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Fifteen

The following example describes use of the aqueous protein ingredient for the production of approximately 3860 kilograms of blueberry and raspberry flavored water based protein beverage with a whey protein concentration of approximately 1.04%.

Temperature should be maintained in the range of 20-25 degrees Celsius during the acidification process.

186.77 kg of Trega Aqueous Whey Protein Isolate at 21.50% (w/w) total protein was diluted by addition and slow mixing of 3600.98 kg of water.

Approximately 1.544 kg malic acid was added with constant mixing.

Flavors, colors, fiber, and sweeteners were added as follows: 772.22 g sucralose sweetener, 3861.11 g Mastertaste freeze dried Raspberry Fruit 705353 powder, 1930.55 g Colormaker Red Cabbage 2714 powder, 44.403 kg VitaSugar fiber, 11583.32 g VDare Blueberry natural flavor, and 7722.22 g VDare Raspberry natural flavor.

Final pH of 3.05 to 3.15 was achieved by addition of approximately 1.544 kg citric acid.

The bulk beverage was pasteurized in a manner common to the beverage and fruit juice industries known as "hot-fill", where product is thermally processed in a continuous flow with a maximum temperature of 160-200 degrees Fahrenheit with a holding time at that maximum temperature ranging from about 15 seconds to about 3 seconds. Product is cooled slightly to 160-185 degrees Fahrenheit just prior to being filled into glass or plastic containers designed for hot-fill.

Example Sixteen

The following example describes production of a natural lemon-lime carbonated protein beverage using aqueous protein ingredient (a whey protein isolate ("WPI")) for the production of 1921 Kg/4235.25 lbs approx., during Oct. 17, 2011, of a natural fruit-flavored, carbonated protein beverage with a whey protein concentration of approximately 4.3%. This product has remained under control of the inventors for monitoring and testing, and was not sold or made publicly available.

On Oct. 14, 2011, approximately 8326 lbs/3784.5 Kg of Iso-Chill A9000 WPI (21.5% concentration of aqueous whey protein isolate—equivalent to 1790 lbs/813.7K approximately of dry whey protein isolate powder) was prepared using phosphoric acid to acidify the aqueous whey protein isolate to a 3.2 pH.

The following steps were used to prepare the 21.5% (w/w) concentration of aqueous whey protein isolate. The original aqueous whey protein collected from membrane filtration isolation, had a protein content of 33.3% (w/w) and was diluted by the slow mixing of water in the amount of 25% of the original weight of the 33.3% (w/w) solution. Approximately 5% by weight of 85% phosphoric acid was added at a rate of around 5 Kg per minute with constant mixing, with the end point being a target of 3.2+/−0.2 pH. This process yielded 3784.5 Kg 21.5% (w/w) concentration of aqueous whey protein isolate.

The acidified aqueous protein isolate (21.5% (w/w)) was then transferred into 4 totes secured with safety seals (seal #0459914) on top, as the totes discharge from the bottom, as is well known to manufacturing operatives in the beverage concentrate industry.

The totes were transported from Trega Foods/Agropur (Luxemburg, Wis.) to Krier Foods (Random Lake, Wis.) on a refrigerated truck with temperature set between 35-45° F. on Oct. 15, 2011.

The aqueous protein ingredient, Iso-Chill A9000 WPI was manufactured on Oct. 14, 2011 and delivered on Oct. 15, 2011 and used in manufacture at Krier Foods on Oct. 17, 2011. (Trega Foods (a division of Agropur Cooperative, Quebec, Canada) specifies the shelf life of Iso-Chill A9000 WPI as 7 days.)

While less than 72 hours passed between manufacture of the 21.5% (w/w) whey protein isolate until use in the production of the fruit flavored carbonated protein beverages, previous experience taught that while 33.3% (w/w) aqueous whey protein isolate could not be acidified successfully and transported for use in manufacture of carbonated or still protein beverages, it was unexpectedly discovered that acidified aqueous whey protein=/<21.5% (w/w) was not only stable for 7-10 days at room temperature (about 18.3° C.) for transportation from production site to beverage manufacturing plant, but also if refrigerated around 4° C., the 21.5% (w/w) aqueous whey protein isolate could be stored for about a month prior to adding the acidified aqueous whey protein isolate into the protein beverage manufacturing process. Upon arrival at the beverage manufacturing plant, Krier Foods, the totes were held in storage at approximately 50-55° F. for 40 hours prior to manufacture.

As part of the manufacturing process, the 21.5% (w/w) aqueous whey protein isolate was transferred to the batch mixing tank.

As part of the processing of the 21.5% (w/w) aqueous whey protein ingredient, the target pH was set at 3.15. The ingredient arrived at Krier Foods in excess of 3.15 pH, therefore phosphoric acid was blended in very small 454 g increments into the mixing batch tank with a target 3.0 pH at least.

Then to bring the pH lower, to ensure optimal sweetness/tartness ratios as is well known to those versed in the art and science of beverage flavor chemistry, a combination of one or more fruit acids (citric, malic, etc.) could be added to this particular batch ensure a target 2.85-2.95 pH level.

In preparing this batch of non-pasteurized Natural Lemon Lime Carbonated Protein Beverage, 3.842 Kg of citric acid was used to obtain a target 2.95 pH.

The final batch weight was 1921 Kg/4235.25 lbs by calculation including all ingredients and water.

As an integral part of the processing steps, certain natural ingredients and flavors (green coffee extract, sweeteners, flavors and color) were added to a Breddo Likwifier (a division of Corbion Caravan in Kansas City, Mo.).

The green coffee extract, sweeteners, flavors and color were added to the batch mixing tank after they were comprehensively blended in the Breddo Likwifier to levels and degrees necessary as by one skilled in the art and science of beverage manufacture.

The final Natural Lemon Lime Carbonated Protein Beverage was then filled into 16 fl. oz./473 ml can (Ball Corporation, Broomfield, Colo.) using a "cold-fill" process, carbonated in the can, and sealed with an easy-opening, stay-tab closure. Carbonation was set at 2.3 vols per can. Actual carbonation measurement was 2.1 vols.

Tunnel Pasteurization: All but 72 cans of this production run for the Natural Lemon Lime Carbonated Protein Beverage was then tunnel pasteurized at 143° F. (61.7° C.) at 10 minutes approx.

Non-pasteurized product: 72 sealed cans of Natural Lemon Lime Carbonated Protein Beverage from the tail end of the production run were removed from the conveyer belt prior to tunnel pasteurization, therefore, they were not pasteurized.

The fill density was 15.5 floz/465 g per 473 mL/16 oz. can

The following formula was used to prepare the preservative-free Natural Lemon Lime Carbonated Protein Beverage product using concentrated WPIaq (Isochill A-9000) having a measured protein concentration of 21.50% (w/w):

| Enter Batch gallons: | 500 | weighing | 1921.091 | kg | 4235.28 | |
|---|---|---|---|---|---|---|
| XAPP Natural Lemon Lime Energy | Weight % | Amount | units | Gallons | POUNDS | added |
| INGREDIENT | | | | | | |
| Water | 76.21339 | 1464.13 | kilograms | 386.8 | | |
| Isochill A-9000 | 23.25581 | 446.7652 | kilograms | | 984.94954 | |
| Nat Lemon-Lime | 0.1 | 1.921091 | kilograms | | 4.235283 | |
| Green Coffee extract 70% caffeine | 0.027 | 518.6944 | grams | | 1.1435264 | |
| Futureceuticals | | | | | | |
| Nat Orange/Nat Van | 0.09 | 1728.9815 | grams | | 3.8117547 | |
| STEVIA Wisdom Natural Brands | 0.064 | 1229.4979 | grams | | 2.7105811 | |
| Sweetleaf | | | | | | |
| FruitSweetness FSN Biovittorial/ | 0.032 | 614.7490 | grams | | 1.3552906 | |
| Tate&Lyle | | | | | | |
| Talin Naturex | 0.016 | 307.37 | grams | | 0.6776453 | |
| Citric Acid as needed to pH 3.0 approx | 0.2 | 3842.18 | grams | | 8.4705661 | |
| Colomaker Turmeric 2710 | 0.0018 | 34.58 | grams | | 0.0762351 | |
| TOTAL | 100% | | | | | |
| Enter WPIaq % Protein (decimal): | 21.50% | | | | | |
| No preservatives or anti-microbial agents are contained in the pastuerized or non-pasteurized formulas | | | | | | |

Manufacturing Results:

Brix setting - 7.03
pH - 2.95 (final can 2.97)
Fill temperature - 50° F.
Air - 0.25
Carbonation - 2.0 vols (final can 2.1 vols)
Turbidity - 68.7 NTU Carbonation levels in this embodiment can be increased or decreased depending upon the intended end use and application of the final carbonated protein beverage and its desired organoleptic experience when ingested, as well as, the required visual and sensory impact of the drink when ingesting it from a can, glass, cup or mug.

Actual carbonation levels may also depend upon protein concentration—the higher the protein concentration, the more significant effervescence affect carbonation has on the drink. Therefore one skilled in the art of making carbonated protein drinks, can adjust the carbonation levels for best affect and consumer delight.

Example Seventeen

Microbiological testing of the non-pasteurized preservative-free All Natural Lemon Lime Carbonated Protein Beverage natural lemon-lime carbonated protein beverage of the preceding example (Example 16) yielded the following results:

| Non-Pasteurized All Natural Lemon Lime Energy XAPP Microbiological Testing Results | | | | | |
|---|---|---|---|---|---|
| | Date Analyzed & Corresponding Results | | | | |
| Certificate of Analysis | Dec. 8, 2011 | Jan. 10, 2012 | Feb. 29, 2012 | Mar. 29, 2012 | Sep. 5, 2012 |
| Aerobic Plate Count | <1 | <1 | <1 | <1 | <1 |
| Coliform Count | <1 | <1 | <1 | <1 | <1 |
| Escherichia coli USP | Negative | Negative | Negative | Negative | Negative |
| Weight for Escherichia coli USP | 25 | 25 | 25 | 25 | 25 |
| Staphylococci, coagulase positive | <1 | <1 | <1 | <1 | <1 |
| Salmonelle (VIDAS) | Negative | Negative | Negative | Negative | Negative |
| Weight for Salmonella | 100 | 100 | 100 | 100 | 100 |
| Mold Count | <1 | <1 | <1 | <1 | <1 |
| Yeast Count | 23 | <1 | <1 | <1 | <1 |

These microbiological testing results were completed at Minnesota Valley Testing Laboratories (MVTL) located in New Ulm, Minn. on the dates noted in the chart above.

All non-pasteurized samples were sent in for testing after being held in an incubator (VWR Scientific Model 1915 Incubator) which was continuously set at 34.5° C.

The number of days between the date of production (Oct. 17, 2011) and the date of testing (give or take the few days involving in shipping to NEXT Proteins, Inc.) were multiplied by 3 as the incubator accelerates shelf life testing to equate to 3 days shelf like for every 1 day in the incubator.

The non-pasteurized Natural Lemon Lime Carbonated Protein Beverage was produced on Oct. 17, 2011 and was put in the accelerated incubator within a few days of production (approximately Oct. 20, 2011) and held there until Sep. 1, 2012 before being shipped to MVTL for testing.

Therefore the sample cans had been in the incubator for 10 months which equates to 30 months (2.5 years) of shelf life. This product was safe for human consumption at that time.

This Natural Lemon Lime Carbonated Protein Beverage has the following nutritional content per 16 oz. can:

Calories - 80
Total Fat - 0 g
Cholesterol - 0 mg
Sodium - 30 mg
Potassium - 110 mg
Total Carb. - 0 g
Fiber - 0 g
Sugars - 0 g
Protein - 20 g
Vitamin A - 0%
Vitamin C - 0%
Calcium - 5%
Iron - 0%
Magnesium - 2%

Example Eighteen

The following example describes the use of a portable turbidity meter (LaMotte 2020we/wi) to test samples of a still (non-carbonated) and then carbonated protein beverage of identical formulas.

A still acidified aqueous protein fruit flavored beverage comprising of 20 g whey protein isolate in 16 floz./473 ml container including natural and artificial flavors, colors and sweeteners was prepared at pH 3.1+/−0.1, with a final protein concentration of about 4.2% (w/w). A 10 ml sample of this still protein beverage was extracted and placed in one of the turbidity measuring containers provided with the LaMotte turbidity meter. The instructions provided with the turbidity meter were followed. An average of 5 readings provided the following turbidity measurements: 20.1+/−0.5 NTU (Nephelometric Turbidity Units)

The same sample was then carbonated to about 2.5 vols of $CO_2$. Turbidity measurements were then repeated using this carbonated sample. Within one minute after carbonation, the average turbidity meter reading was 44.6 NTU, however 5 minutes later the turbidity meter reading was 25.3 NTU which stabilized over the 15 minutes to 25 NTU.

These turbidity measurements were carried out in room temperature of 68° F./20° C.

Example Nineteen

The following example describes the use of a portable turbidity meter (LaMotte 2020we/wi) to test samples of a still and then carbonated protein beverage of identical formulas.

A still acidified aqueous protein fruit flavored beverage comprising of 12 g whey protein isolate in 12 floz./355 ml container including natural and artificial flavors, colors and sweeteners was prepared at pH 3.0+/−0.1, with a total protein concentration of about 3.4% (w/w). A 10 ml sample of this still protein beverage was extracted and placed in one of the turbidity measuring containers provided with the LaMotte turbidity meter. The instructions provided with the turbidity meter were followed. An average of 5 readings provided the following turbidity measurements: 24.8 NTU (Nephelometric Turbidity Units)

The same sample was then carbonated to about 2.5 vols of $CO_2$. After 15 minutes stabilized to approx. 29.5 NTU.

These turbidity measurements were carried out in room temperature of 72° F./22.2° C.

Example Twenty

The following example describes the use of a portable turbidity meter (LaMotte 2020we/wi) to test samples of a still and then carbonated protein beverage of identical formulas.

A still acidified aqueous protein fruit flavored beverage comprising of 10 g whey protein isolate in 12 floz./355 ml container including natural and artificial flavors, colors and sweeteners was prepared at pH 3.0+/−0.1, having a total protein concentration of about 2.8% (w/w). A 10 ml sample of this still protein beverage was extracted and placed in one of the turbidity measuring containers provided with the LaMotte turbidity meter. The instructions provided with the turbidity meter were followed. An average of 5 readings provided the following turbidity measurements: 19.2 NTU (Nephelometric Turbidity Units)

The same sample was then carbonated to about 2.5 vols of $CO_2$. After 15 minutes stabilized to approx. 23.4 NTU.

These turbidity measurements were carried out in room temperature of 72° F./22.2° C.

Example Twenty-One

Lemon Lime Recovery Carbonated Protein Beverage

The following example describes the use of a portable turbidity meter (LaMotte 2020we/wi) to test a sample of a carbonated protein beverage of the following formula, prepared using a concentrated acidified WPIaq (Isochill A-9000) product with a measured protein concentration of about 21.50% (w/w) to prepare a carbonated beverage with a final total protein concentration of about 5.19% (w/w):

| Enter Batch gallons: | 1260 | weighing | 4841.148 | kg | 10672.91 | |
|---|---|---|---|---|---|---|
| XAPP Lemon Lime Recovery | Weight % | Amount | units | Gallons | POUNDS | added |
| INGREDIENT | | | | | | |
| Water | 74.936 | 3627.76 | kilograms | 958.4 | | |
| Isochill A-9000 | 24.651 | 1193.3993 | kilograms | | 2631.0 | |
| Nat Lemon-Lime RA53 | 0.080 | 3.872918 | kilograms | | 8.54 | |
| Sucralose 99+% Dry | 0.021 | 1.016641 | kilograms | | 2.241 | |
| Nat Orange/Nat Van PB26 | 0.09 | 4.357033 | kilograms | | 9.60561 | |
| Citric Acid as needed to pH 3.0 approx | 0.2 | 9.682296 | kilograms | | 21.3458 | |
| Colomaker Turmeric 2710 | 0.0015 | 0.072617 | kilograms | | 0.1601 | |
| Potassium Benzoate | 0.02 | 0.968230 | kilograms | | 2.1346 | |
| TOTAL | 100% | | | | | |
| Enter WPlaq % Protein (decimal): | 21.50% | | | | | |

A 10 ml sample of this carbonated beverage was extracted and placed in one of the turbidity measuring containers provided with the LaMotte turbidity meter. The instructions provided with the turbidity meter were followed. An average of 5 reading provided the following turbidity measurements: 97 NTU (Nephelometric Turbidity Units)

These turbidity measurements were carried out in room temperature of 72° F./22.2° C.

Example Twenty-Two

Lemon Lime Energy Carbonated Protein Beverage

The following example describes the use of a portable turbidity meter (LaMotte 2020we/wi) to test a sample of a carbonated protein beverage of the following formula, prepared using a concentrated acidified WPIaq (Isochill A-9000) product with a measured protein concentration of about 21.54% (w/w), to prepare a carbonated protein beverage with a final total protein concentration of about 3.3% (w/w):

| Enter Batch gallons: | 2250 | weighing | 8644.907 | kg | 19058.8 | |
|---|---|---|---|---|---|---|
| XAPP Lemon Lime Recovery | Weight % | Amount | units | Gallons | POUNDS | added |
| INGREDIENT | | | | | | |
| Water | 74.962 | 6480.40 | kilograms | 1711.9 | | |
| Isochill A-9000 | 24.605 | 1193.3993 | kilograms | | 2631.0 | |
| Nat Lemon-Lime RA53 | 0.080 | 6.915926 | kilograms | | 15.25 | |
| Sucralose 99+% Dry | 0.021 | 1.016641 | kilograms | | 4.002 | |
| Caffeine 98+% Dry | 0.020 | 1.728981 | | | 3.812 | |
| Nat Orange/Nat Van PB26 | 0.090 | 7.780417 | kilograms | | 17.153 | |
| Citric Acid as needed to pH 3.0 approx | 0.2 | 17.289815 | kilograms | | 38.1175 | |
| Colomaker Turmeric 2710/caramel colorant | 0.0015 | 0.129674 | kilograms | | 0.2859 | |
| Potassium Benzoate | 0.02 | 1.728981 | kilograms | | 3.8118 | |
| TOTAL | 100% | | | | | |
| Enter WPlaq % Protein (decimal): | 21.54% | | | | | |

A 10 ml sample of this carbonated beverage was extracted and placed in one of the turbidity measuring containers provided with the LaMotte turbidity meter. The instructions provided with the turbidity meter were followed. An average of 5 reading provided the following turbidity measurements: 95.8 NTU (Nephelometric Turbidity Units)

These turbidity measurements were carried out in room temperature of 72° F./22.2° C.

\* \* \*

While particular embodiments of the present invention have been disclosed, it is to be understood that various different modifications are possible and are contemplated within the true spirit and scope of the appended claims. There is no intention, therefore, of limitations to the exact abstract, examples, or disclosure herein presented.

I claim:

1. A method of preparing a protein beverage, comprising:
admixing an aqueous protein isolate collected from membrane-filtration isolation of the protein in its native state without substantial drying at a concentration by weight of about 1% to about 35% actual protein substantially free of caseinate;
wherein the aqueous protein isolate is derived from one or more of edible aqueous proteins selected from the group consisting of: whey protein, soy protein, lactalbumin, serum albumin, glycolmacropeptide, rice protein, pea protein, canola protein, wheat protein, hemp protein, zein, flax protein, egg white protein, ovalbumin, or a gelatin protein;
wherein said aqueous protein isolate has been freshly collected from membrane-filtration isolation or has been stored or transported after being collected from membrane-filtration isolation,
slowly mixing said aqueous protein isolate with water to dilute the aqueous protein isolate to a concentration of no more than about 25% by weight protein content;
admixing acid with the diluted aqueous protein isolate in an acidification process to provide an acidified admixture at a pH ranging from about 3 to about 4.6, thereby obtaining an admixture for preparing the protein beverage;
storing or transporting the aqueous protein isolate acidified admixture over a time period of several days prior to further processing, if any, and optionally without drying, thermal processing, or other sterilization treatment at any time in the process;
whereby substantial solubility and stability of the protein without sedimentation is maintained in the aqueous protein isolate throughout the storage and transportation period, and whereby said aqueous protein isolate is essentially free of active microbes known to be harmful to human health throughout the storage and transportation period;
wherein the resulting protein composition has a protein concentration by weight of between about 0.01% and about 15% representing a range from single-strength beverage protein level to a concentrate suitable for acidification, nutrient addition, transport to a beverage manufacturing facility and subsequent dilution, and containerization; and
optionally inactivating nactivating microbes in the resulting composition without thermal processing or other sterilization treatment at any time in the process.

2. A protein beverage concentrate composition suitable for dilution to generate a beverage suitable for human consumption, comprising:
about 0% by weight to about 60% by weight juice concentrate, wherein said juice concentrate has a Brix value of about 20° Brix to about 75° Brix;
about 0.02% by weight to about 75% by weight actual protein substantially free of caseinate, derived from an aqueous protein isolate collected from membrane-filtration isolation of the protein and without substantial drying;
wherein said aqueous protein isolate has been freshly collected from membrane-filtration isolation or has been stored or transported after being collected in its native state from membrane-filtration isolation in its native state without thermal processing or other sterilization treatment; and
wherein the aqueous protein isolate is derived from one or more of edible aqueous proteins selected from the group consisting of whey protein, soy protein, lactalibumin, serum albumin, glycolmacropeptide, rice protein, pea protein, canola protein, wheat protein, hemp protein, zein, flax protein, egg white protein, ovalbumin, or a gelatin protein;

water to dilute the concentrate composition to no more than 25% by weight;

wherein the pH of the aqueous protein isolate has been adjusted to a pH ranging from about 3 to about 4.6; and whereby both at the time of packaging of the protein beverage concentrate and during subsequent storage without refrigeration, substantial solubility of the protein is maintained in the protein beverage concentrate, and whereby said protein beverage concentrate is essentially free of pathogenic microbes known to be harmful to human health, both at the time of packaging of the protein beverage concentrate and during subsequent storage.

3. A protein beverage composition suitable for human consumption made by the method of claim 1.

4. A method of preparing a protein beverage composition in accordance with claim 1 further comprising admixing said acidified admixture with one additional ingredient selected from the group consisting of water, juice, alcohol, carbonation, a concentrated plant extract, an anti-foaming agent, a nutrient, calcium or a calcium derivative, an energy-generating additive, an herbal supplement, a flavoring agent, a sweetener, a preservative or a coloring agent.

5. A method of preparing a protein beverage composition in accordance with claim 4 wherein the concentrate is a protein beverage concentrated syrup.

6. A method of preparing a protein beverage composition in accordance with claim 5, wherein the concentrated syrup ranges from about a 2-fold concentrate to about a 25-fold concentrate.

7. A method of preparing a protein beverage composition in accordance with claim 1, wherein the protein beverage is essentially free of active microbes known to be harmful to human health, both at the time of packaging of the protein beverage and for a time period of at least one year after packaging.

8. A method of preparing a protein beverage composition in accordance with claim 1, wherein juice is added to the acidified admixture to achieve a concentration of about 0% by weight to about 98% by weight in the resulting composition.

9. A method of preparing a protein beverage composition in accordance with claim 1, wherein the resulting protein beverage is clear or transparent in color, exhibiting essentially no turbidity.

10. A method of preparing a protein beverage composition in accordance with claim 1, further comprising:

admixing a juice concentrate having a Brix value of about 20° Brix to about 75° Brix, to achieve a percent by weight of juice concentrate of about 0% by weight to about 60% by weight juice, to achieve a percent by weight of protein in the admixture of about 0.02% by weight to about 75% by weight; and packaging the protein beverage concentrate in a container which may be stored at room temperature.

11. A method of preparing a protein beverage composition in accordance with claim 1, further comprising diluting one part of the protein beverage concentrate with four parts liquid to prepare a resulting protein beverage suitable for human consumption.

12. A method of preparing a protein beverage composition in accordance with claim 1, wherein the protein beverage concentrate may be used by an individual, in a food services beverage dispenser, or in a bottling plant.

13. A method of preparing a protein beverage composition in accordance with claim 1, further comprising drying the protein beverage concentrate to form a protein juice beverage concentrated powder by lyophilization, spray drying, fluid bed drying, drum drying, or combinations thereof.

14. A method of preparing a protein beverage composition in accordance with claim 1, further comprising admixing a carbonation gas with the diluted aqueous protein isolate.

* * * * *